(12) United States Patent
Pyron

(10) Patent No.: US 12,366,303 B2
(45) Date of Patent: Jul. 22, 2025

(54) CHECK VALVE ADAPTER FOR ELECTRICAL SUBMERSIBLE PUMPS

(71) Applicant: Halliburton Energy Services, Inc., Houston, TX (US)

(72) Inventor: Steven Pyron, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 155 days.

(21) Appl. No.: 18/376,650

(22) Filed: Oct. 4, 2023

(65) Prior Publication Data
US 2025/0116345 A1 Apr. 10, 2025

(51) Int. Cl.
*F16K 27/02* (2006.01)
*E21B 43/12* (2006.01)

(52) U.S. Cl.
CPC ........ *F16K 27/0209* (2013.01); *E21B 43/128* (2013.01); *F16K 2200/501* (2021.08)

(58) Field of Classification Search
CPC ........... F16K 27/0209; F16K 2200/501; E21B 43/128
See application file for complete search history.

(56) References Cited

U.S. PATENT DOCUMENTS

| | | | |
|---|---|---|---|
| 11,313,180 B1 * | 4/2022 | Eitschberger | E21B 47/12 |
| 2008/0178948 A1 | 7/2008 | Wilmshurst et al. | |
| 2022/0082174 A1 * | 3/2022 | Ruzicka | F16K 27/0209 |

FOREIGN PATENT DOCUMENTS

| | | |
|---|---|---|
| CN | 2854137 Y | 1/2007 |
| CN | 208442305 U | 1/2019 |
| CN | 218625544 U | 3/2023 |
| EP | 2948680 B1 | 8/2018 |

OTHER PUBLICATIONS

Foreign Communication from Related Application—International Search Report and Written Opinion of the International Searching Authority, International Application No. PCT/US2023/034744, dated Jun. 28, 2024 11 pages.

* cited by examiner

*Primary Examiner* — P. Macade Nichols
(74) *Attorney, Agent, or Firm* — Conley Rose, P.C.; Rodney B. Carroll

(57) ABSTRACT

One or more check valves may be used in a motor protector for an ESP assembly. Disclosed embodiments relate to a check valve adapter configured to provide additional versatility regarding such check valves. The adapter may have a first end portion, configured for removable attachment to an NPT screw-style vent port, and a second end portion configured to receive a cartridge-style check valve. The first end portion of the adapter is in fluid communication with the second end portion, and the second end portion can be configured to receive the cartridge-style check valve in either orientation, thereby allowing fluid flow through the adapter in either direction merely based on the orientation of the cartridge-style check valve. Systems for using an adapter with a cartridge-style check valve in an ESP assembly, as well as methods of controlling fluid flow in a motor protector using such an adapter, are also disclosed.

20 Claims, 8 Drawing Sheets

CHECK VALVE ADAPTER FOR ELECTRICAL SUBMERSIBLE PUMPS

CROSS-REFERENCE TO RELATED APPLICATIONS

None.

STATEMENT REGARDING FEDERALLY SPONSORED RESEARCH OR DEVELOPMENT

Not applicable.

FIELD

This disclosure relates generally to the field of pumping. More particularly, this disclosure relates to the field of electric submersible pumps for use downhole in a well. Still more particularly, this disclosure relates to seal units for electrical submersible pump assemblies, and to exemplary adapters which may be used therewith for improvement of such seal units.

BACKGROUND

Electric submersible pump (ESP) assemblies are used to artificially lift fluid to the surface, for example in deep wells such as oil or water wells. ESP assemblies are commonly used in the oil and gas industry to extract fluids from underground reservoirs. By way of example, the artificial lift provided by ESP assemblies may be useful in situations when the reservoir does not have sufficient energy to allow the well to naturally produce effectively, or when an additional boost to production of the well is desired. Improvements to ESP assemblies can improve overall production of fluids from a well, which may thereby improve the profitability of the well. Improvements in the construction and assembly of the ESP assembly and/or its component parts may result in lower ESP assembly costs and/or in improved characteristics (such as ease of maintenance).

A typical ESP assembly comprises, from bottom to top, an electric motor, a seal unit, a pump intake, and a pump (e.g. typically a centrifugal pump), which are all mechanically connected together with shafts and shaft couplings. The electric motor supplies torque to the shafts, which provides power to the centrifugal pump. The electric motor is isolated from a wellbore environment by a housing and by the seal unit/section. The seal unit can act as an oil reservoir for the electric motor. The oil can function both as a dielectric fluid and as a lubricant in the electric motor. The seal unit also may provide pressure equalization between the electric motor and the wellbore environment.

The centrifugal pump is configured to transform mechanical torque received from the electric motor via a drive shaft to fluid pressure which can lift fluid up the wellbore. For example, the centrifugal pump typically has rotatable impellers within stationary diffusers. A shaft extending through the centrifugal pump is operatively coupled to the motor, and the impellers of the centrifugal pump are rotationally coupled to the shaft. In use, the motor can rotate the shaft, which in turn can rotate the impellers of the centrifugal pump relative to and within the stationary diffusers, thereby imparting pressure to the fluid within the centrifugal pump. The electric motor is generally connected to a power source located at the surface of the well using a cable and a motor lead extension. The ESP assembly is placed into the well and usually is inside a well casing. In a cased completion, the well casing separates the ESP assembly from the surrounding formation. In operation, perforations in the well casing allow well fluid to enter the well casing and flow to the pump intake for transport to the surface.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Figure 1:
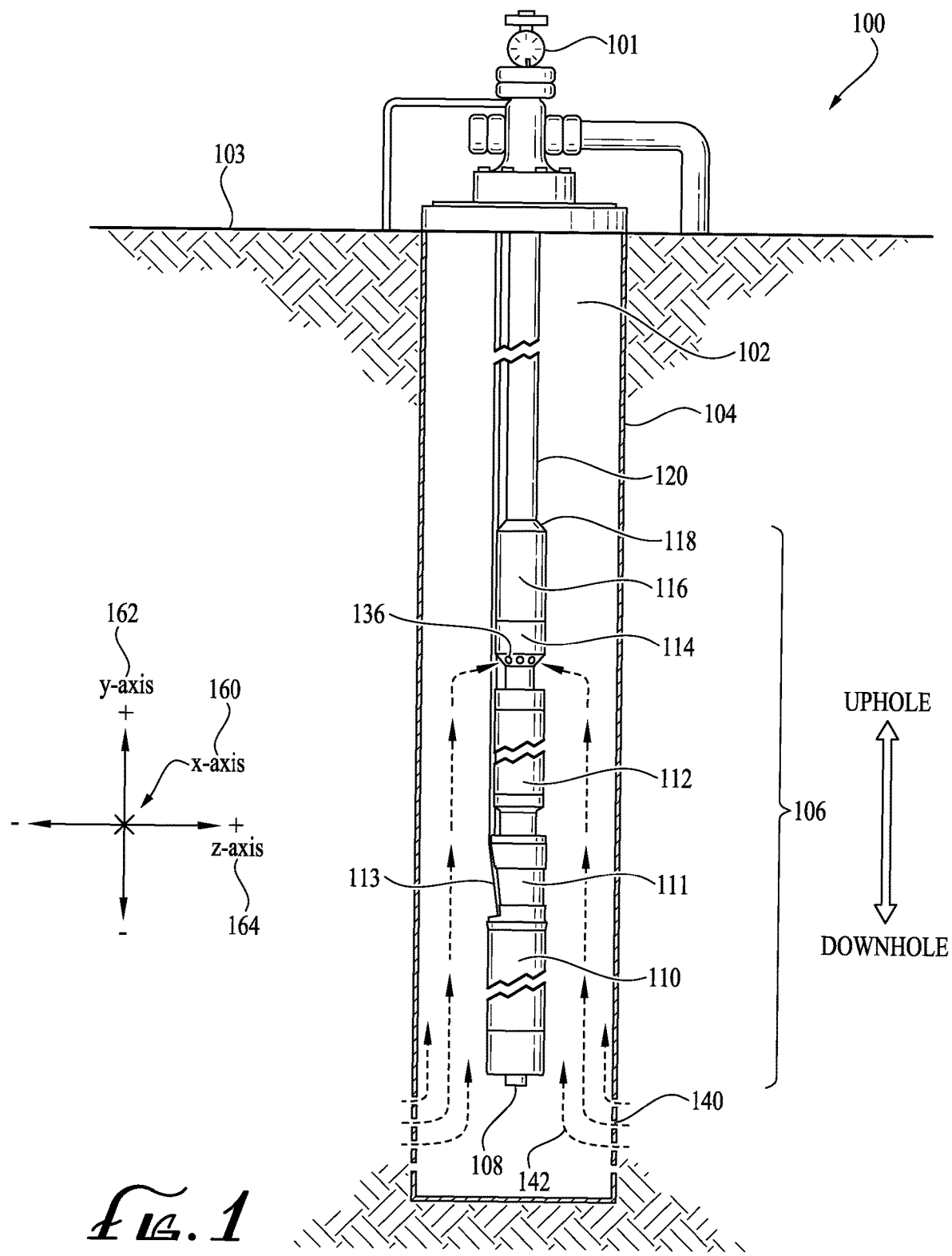
FIG. 1 is a schematic illustration of an exemplary electrical submersible pump (ESP) assembly disposed in a wellbore, according to an embodiment of the disclosure.

The terms "uphole" and "downhole" may be used to describe the location of various components of drilling system 100 relative to the bottom or end of wellbore 116 shown in FIG. 1. For example, a first component described as uphole from a second component may be further away from the end of wellbore 116 (e.g. closer to the surface) than the second component. Similarly, a first component described as being downhole from a second component may be located closer to the end of wellbore 116 (e.g. further from the surface) than the second component. Terms like up, down, top, bottom, above, and below similarly relate to descriptions relative to uphole and downhole directions.

Disclosed embodiments may relate to seal units for electrical submersible pump assemblies, and to exemplary adapters which may be used therewith for improvement of such seal units. For example, a seal unit (also called a motor protector) may have one or more flowpaths therethrough, and there may be a need to control flow in the flowpaths. One type of flow control mechanism is a one-way valve, such as a check valve, which may be disposed in one or more of the flowpaths. There are multiple different types of check valves, for example with different connection mechanisms and/or different sealing mechanisms. Disclosed embodiments may also relate to devices configured to allow different check valves to be used effectively and easily in the same port in a flowpath, for example without the need to re-machine the port.

Turning now to FIG. 1, an exemplary producing well environment 100 is described. In an embodiment, the environment 100 comprises a wellhead 101 above a wellbore 102 located at the surface 103. A casing 104 is provided within the wellbore 102. For convenience of reference, FIG. 1 provides a directional reference comprising three coordinate axes—an X-axis 160 where positive displacements along the X-axis 160 are directed into the sheet and negative displacements along the X-axis 160 are directed out of the sheet; a Y-axis 162 where positive displacements along the Y-axis 162 are directed upwards on the sheet and negative displacements along the Y-axis 162 are directed downwards on the sheet; and a Z-axis 164 where positive displacements along the Z-axis 164 are directed rightwards on the sheet and negative displacements along the Z-axis 164 are directed leftwards on the sheet. In the embodiment of FIG. 1, the Y-axis 162 is approximately parallel to a central axis of a vertical portion of the wellbore 102.

An exemplary electric submersible pump (ESP) assembly 106 is deployed downhole in a well within the casing 104 and comprises an optional sensor unit 108, an electric motor 110 with a motor head 111, a seal unit 112, an electric power cable 113, a pump intake 114, a centrifugal pump 116, and a pump outlet 118 that couples the centrifugal pump 116 to a production tubing 120. Typically, the seal unit 112 of the ESP assembly 106 may be disposed between the electric motor 110 and the pump 116 in the ESP assembly. The centrifugal pump 116 is operatively coupled to the motor 110 by a shaft (not shown, which may extend for example through the seal unit 112). In an embodiment, the ESP assembly 106 may employ thrust bearings in several places, for example in the electric motor 110, in the seal unit 112, and/or in the centrifugal pump 116. While not shown in FIG. 1, in an embodiment, the ESP assembly 106 can comprise a gas separator that may employ one or more thrust bearings. The motor head 111 couples the electric motor 110 to the seal unit 112. The electric power cable 113 may connect to a source of electric power at the surface 103 and to the electric motor 110, for example being configured to provide power from the source of electric power at the surface 103 to the electric motor 110.

In operation, the casing 104 is pierced by perforations 140, and reservoir fluid 142 flows through the perforations 140 into the wellbore 102. The fluid 142 flows downstream in an annulus formed between the casing 104 and the ESP assembly 106, is drawn into the pump intake 114, is pumped by the centrifugal pump 116, and is lifted through the production tubing 120 to the wellhead 101 to be produced at the surface 103. The fluid 142 may comprise hydrocarbons such as oil and/or gas, water, or both hydrocarbons and water.

While the example illustrated in FIG. 1 relates to land-based subterranean wells, similar ESP systems can be used in a subsea environment and/or may be used in subterranean environments located on offshore platforms, drill ships, semi-submersibles, drilling barges, etc. And while the wellbore is shown in FIG. 1 as being approximately vertical, in other embodiments, the wellbore may be horizontal, deviated, or any other type of well. Also, while the pump of the ESP is described with respect to FIG. 1 as a centrifugal pump, other types of pumps (such as a rod pump, a progressive cavity pump, any other type of pump suitable for the system, or combinations thereof) may be used instead.

Typically, the seal unit 112 of the ESP assembly 106 may be disposed between the motor 110 and the pump 116 in an ESP assembly. The electric motor 110 is isolated from a wellbore environment by its housing and by the seal unit 112, which is sometimes called a motor protector. To function properly and/or to operate durably, the motor 110 must be protected from ingress of well fluids. Thus, the motor protector/seal unit 112 may provide a barrier to keep well fluids from the motor 110 (e.g. restricting the flow of wellbore fluids into the motor 110). In embodiments, the seal unit 112 can act as an oil reservoir for the electric motor 110, for example with the oil functioning as a dielectric fluid and/or as a lubricant in the electric motor 110 (e.g. with the oil reservoir fluidly communicating with the motor 110). Thus, the seal unit 112 may also provide a barrier to keep well fluids separate from the oil of the motor 110. The seal unit 112 also may provide pressure equalization (e.g. balancing the pressure, for example to prevent too large a pressure differential from forming) between the electric motor 110 and the wellbore environment, to allow for expansion of motor oil based on conditions in the well and/or the operating conditions of the motor 110 (e.g. accommodating expansion and contraction of oil, for example as the motor 110 goes through various thermal cycles during operation). For example, as the oil of the motor 110 (e.g. within and/or in fluid communication with the seal unit 112) heats up during use of the motor 110, it will expand in volume. The seal unit 112 may be configured to accommodate such expansion to a point, and/or may be configured to vent oil in instances in which the expansion becomes too great (e.g. to prevent pressure of the expanded oil from damaging the seal unit 112, which could in turn allow well fluids into the motor 110, thereby damaging the motor 110).

The seal unit 112 may be configured with one or more seal elements which are configured to accommodate volume changes and movement of fluid within the seal unit 112, while also acting to separate clean oil for the motor 110 from wellbore fluids. For example, the seal unit 112 may comprise one or more expandable element (such as an elastomeric bag or bellows) and/or one or more labyrinth chamber. In embodiments, the expandable element may be configured to contain motor oil, to partition motor oil within the expandable element from well fluids outside the expandable element (e.g. well fluids located between the expandable element and the housing of the seal unit 112, for example as wellbore fluids pass through the ESP assembly 106—in embodiments, such wellbore fluids may be disposed in a chamber of the housing of the seal unit 112 in which the expandable element is disposed, external to the expandable unit, while the oil may be disposed within the expandable element), and/or to expand and contract in response to temperature and/or pressure changes experienced by the motor oil in the wellbore. This can be a useful feature, since ESP assemblies 106 often experience high temperature environments, for example reaching temperatures of approximately 350-400, 350-550, 400-550, 450-550, or 500-550 degrees Fahrenheit. Some embodiments may also comprise one or more labyrinth chamber, for example in fluid communication with the expandable element, which may provide a tortuous path for fluid therethrough and/or help seal against ingress of well fluids.

In embodiments, the seal unit 112 may also be configured to ensure that pressure in the expandable element does not exceed a set point (e.g. which may be set to prevent damage to the expandable element and/or the motor 110 and/or to ensure that the oil pressure does not exceed a pre-set level). For example, the seal unit 112 may be configured to provide pressure equalization. In embodiments, this may be provided by having a vent port disposed between and in fluid communication with the expandable element (e.g. the interior space of the expandable element, in which the oil may be disposed) and the exterior environment (e.g. the wellbore environment, or some chamber in fluid communication with the wellbore environment). The vent port(s) may function (e.g. with a valve) to provide an outlet for expansion of the oil, allowing excess oil volume to be vented to the wellbore, without allowing wellbore fluids to enter the expandable element. For example, a check valve disposed in the vent port may be configured to allow oil flow out of the expandable element when pressure is sufficiently great, but sealing otherwise to prevent ingress of wellbore fluids through the vent port and into the expandable element. The check valve may also control the differential pressure between the oil inside the expandable element and the wellbore fluids between the exterior of the expandable element and the housing, for example allowing no more than 25 psi pressure differential. In embodiments, the vent port may be disposed in steel bar stock (for example forming the head and/or housing of the seal unit 112). The vent port may in some instances be threaded to allow for insertion (e.g. removable attachment) of the check valve. For example, the vent port may be configured to receive an NPT screw-in (e.g. threaded) check valve.

In some seal unit 112 embodiments, there may be more than one seal element. For example, a plurality of expandable elements may be in fluid communication with one another and with the check valve in the vent port. In embodiments in which the expandable element is an elastomeric bag, it may be formed of rubber, an elastomer, or a material having similar physical properties. In embodiments, the expandable element may be configured to expand and contract longitudinally (e.g. parallel to the shaft) and/or to expand and contract radially. In some embodiments, the expandable element may be an accordion-style bellows (which may be metal in some embodiments), for example configured to expand and contract longitudinally.

In embodiments, the seal unit 112 may comprise a housing, a shaft, and an expandable element. The housing may be configured to protect internal components of the seal unit 112 from the wellbore environment. The shaft may be configured to pass mechanical energy from the motor 110 to the pump 116. The expandable element may be disposed within the housing, for example radially between the shaft and the interior surface of the housing. In embodiments, the expandable element may be configured to fit around the shaft (e.g. circumferentially), for example defining an enclosed interior space between the shaft and the housing but having a bore therethrough that allows passage of the shaft. The seal unit 112 may also include one or more fluid ports, such as the one or more vent ports configured to provide fluid communication between the interior space of the expandable element and the external environment, such as the space between the exterior of the expandable element and the housing and/or the wellbore environment (e.g. well annulus).

A check valve may be disposed in one or more such vent port, such that the check valve is also in fluid communication with both the interior space of the expandable element and the external environment (e.g. such as the space between the exterior of the expandable element and the housing and/or the wellbore environment). The check valve is configured to only allow fluid communication one direction, e.g. from the interior space of the expandable element to the external environment, and then only when pressure in the expandable element is sufficiently high to open the check valve. For example, the check valve may be biased closed (e.g. have a valve/seal element that is biased closed), but may open when a pre-set pressure is applied to the check valve from the oil in the expandable element in order to allow oil from the interior space of the expandable element to pass into (e.g. vent into) the space (e.g. seal unit annular space) between the exterior of the expandable element and the housing.

In operation, as oil in the seal unit 112 (and or the motor, to which the seal unit may be in fluid communication with) heats, it expands. The expandable element expands to accommodate the expansion of the oil, thereby preventing excess pressure buildup within the expandable element and/or the motor 110. As the expandable element reaches its upper volumetric limit, the pressure of the oil in the interior space of the expandable element rises. Upon oil pressure in the interior space of the expandable element reaching the pre-set level (e.g. the threshold at which the check valve will open), the check valve opens to vent oil from the expandable element into the seal unit annular space (which may be in fluid communication with the wellbore environment), and thereby into the wellbore (e.g. the well annulus), acting as a relief valve. Once sufficient pressure has been relieved by the release of the oil, such that pressure in the interior space of the expandable element drops below the pre-set level (e.g. which may correspond to the allowable pressure differential, such as approximately 25 psi in some embodiments), the check valve closes to prevent fluid flow through the vent port. Furthermore, as the oil cools, its volume in the expandable element may decrease, allowing the expandable element to retract. The one-way nature of the check valve may prevent entrance of wellbore fluids into the expandable element, even if the pressure in the expandable element is less than that of the exterior environment (e.g. the wellbore fluids).

Some embodiments of the seal unit 112 may include a labyrinth seal, for example having a labyrinth chamber. While the labyrinth chamber may be used alone in some embodiments (for example directly in fluid communication with the check valve in the vent port), in other embodiments the labyrinth chamber may be used in conjunction with one or more expandable element. For example, the labyrinth chamber may be in fluid communication with the one or more expandable element, and also (e.g. by being disposed fluidically in series with the expandable element) in fluid communication with the check valve in the vent port.

There are different types of check valves that could be used in a seal unit 112 of an ESP assembly 106. Two exemplary types of check valves are NPT screw-style check valves, which may be secured in a corresponding vent port using corresponding/meshing NPT threads via screwing-in, and cartridge-style check valves, which are configured to slide into a smooth vent port and be held in place, for example using a retaining ring. The cartridge style check valve typically has a seal element on its exterior, in order to sealingly seat within the vent port and ensure that flow though the vent port must pass though the cartridge-style check valve. Such a check valve seal may not be needed with NPT screw-in style check valves, since the NPT screw attachment may provide sufficient seal. Unfortunately, these two styles of check valves are typically not interchangeable, since the vent port in the bar stock must be designed to accept one or the other.

There may be instances in which it may be helpful to be able to use a cartridge style check valve in a vent port that is configured for NPT screw-in style check valves, for example if specific parts are in short supply. There may be instances when it may be useful to be able to retrofit an NPT screw-in style port to accept a cartridge-style check valve. For example, changing the type of check valve for a seal unit 112 would typically require designing, manufacturing and stocking a new bar stock piece for the seal unit 112, and a simpler, quicker, and less costly retrofit could improve flexibility. There may be instances when a cartridge-style check valve may provide superior performance in a specific situation. For example, some applications and/or designs of seal units 112 may work better with one style of check valve versus the other. There may also be instances in which it may be useful to be able to easily switch the direction of the check-valve.

Disclosed embodiments relate to an adapter, which is configured to allow a cartridge-style check valve to be used in an NPT screw-style vent port. Furthermore, the adapter may be configured so that the cartridge-style check valve can be used in either direction within the NPT screw-style vent port, allowing reversal of flow if needed without any changes to the parts. In embodiments, the vent port may be an NPT screw-in style vent port, and the check valve to be used therein may be a cartridge-style check valve. The disclosed adapter embodiments may provide compatibility, for example allowing the same vent port to be used with an NPT screw-in style check valve (without the use of the adapter) and with a cartridge-style check valve (with the adapter).

Figure 2:
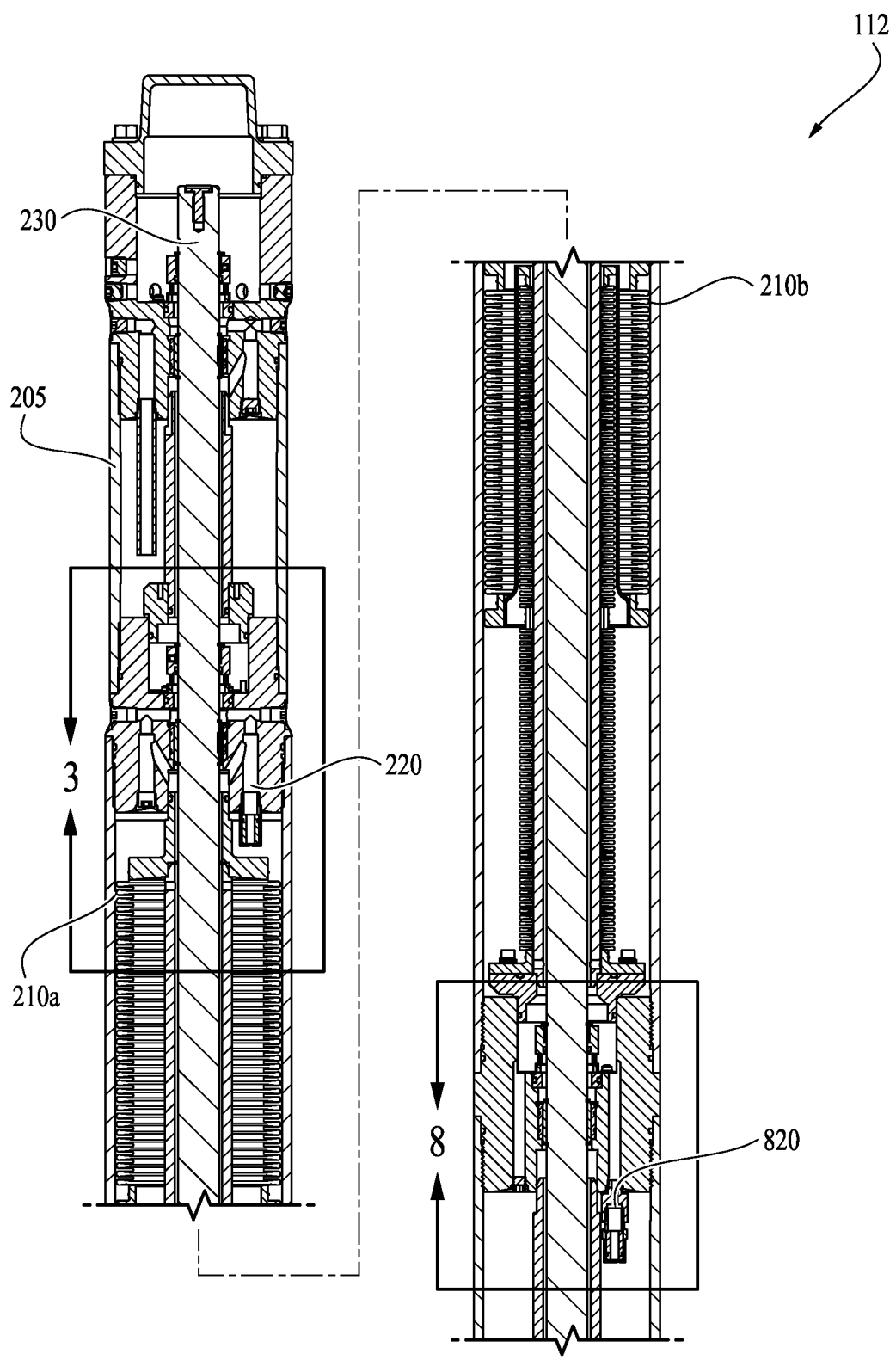
FIG. 2 is a schematic cross-section view of an exemplary motor protector/seal unit of an exemplary ESP assembly, according to an embodiment.

Turning now to FIG. 2, an exemplary embodiment of a motor protector/seal unit 112 of an ESP assembly 106 (e.g. having a motor 110) is shown. For example, the motor protector 112 can comprise: a housing 205, which may for example comprise a hollow cylinder or tube; one or more expandable element 210 disposed within the housing 205, which typically has an interior space configured to hold a fluid such as oil (for example for use in the motor); and one or more NPT screw-style vent port 220. While only a single NPT screw-style vent port 220 is discussed with respect to FIG. 2 (e.g. since any other port shown may be sealed shut), in other embodiments a plurality of such vent ports 220 may be used as discussed herein (such that any reference to one NPT screw-style vent port 220 embodiment should be understood to include similar embodiments having more than one such vent port 220, for example with corresponding adapter and/or check valve). In embodiments, the expandable element 210 may be in fluid communication with the motor 110 of the ESP assembly 106. In the embodiment of FIG. 2, the expandable element 210 is configured to expand, for example in the event that oil in the motor 110 expands due to heating (from the wellbore conditions and/or motor operation).

The NPT screw-style vent port 220 in FIG. 2 is in fluid communication with the interior space of the expandable element 210 and an external environment (e.g. the wellbore). For example, the NPT screw-style vent port 220 can be disposed in the flowpath between the expandable element 210 and the external environment and can provide fluid communication between the expandable element 210 and the external environment. As shown more clearly in FIGS. 3-4, a check valve adapter 305 can be removably coupled to the NPT screw-style vent port 220, and can be configured to (e.g. removably) receive a cartridge-style check valve 310 and, thereby, to place the cartridge-style check valve 310 into fluid communication with both the expandable element 210 and the external environment (e.g. through the NPT screw-style vent port 220).

In some embodiments, the housing 205 may be configured to couple at both ends to other elements in the ESP assembly 106. For example, the housing 205 may be configured to couple at a first end (either directly or indirectly, for example via a motor head) to the motor 110 and at a second end (either directly or indirectly, for example via a pump intake or gas separator) to the pump 116 of the ESP assembly 106. As shown in FIG. 2, a (e.g. rotational) shaft 230 may also be disposed in the housing 205, extending axially through the motor protector 112. The shaft 230 may be configured to transmit mechanical energy from the motor 110 to the pump 116 of the ESP assembly 106 through the motor protector 112/seal unit. In the embodiment of FIG. 2, the one or more expandable element 210 a, b is disposed around the shaft 230, for example circumferentially around the shaft 230 and radially between the shaft 230 and the housing 205. One or more seals may also be disposed within the housing 205, for example with respect to the shaft 230 in order to limit fluid movement along the shaft 230.

In embodiments, the external environment can comprise an exterior space between the expandable element 210 and the housing 205 (e.g. a chamber housing the expandable element 210, external to the expandable element), which typically is in fluid communication with the wellbore (e.g. the annulus of the wellbore). In embodiments, the exterior space can have wellbore fluid disposed therein. In embodiments, the expandable element 210 may comprise one or more selected from the following: an elastomeric bag or a bellows. The expandable element 210 may be configured to expand axially and/or radially, for example as oil therein expands (e.g. due to heating). Typically, the expandable element 210 is in fluid communication with the motor 110.

Some motor protector 112 embodiments may further comprise a labyrinth seal portion/compartment disposed within the housing 205. For example, in embodiments the labyrinth seal portion may be disposed external to the expandable element 210. The labyrinth seal portion may be in fluid communication with the expandable element 210 and the NPT screw-style vent port 220. The adapter 305 may in some embodiments be located in proximity to the labyrinth seal portion, which can limit space for the adapter 305 and/or raise the possibility that, in some instances, the bore of the adapter 305 may be blocked. Some embodiments of the motor protector 112 may also include a thrust bearing, for example disposed in the housing 205.

Figure 4:
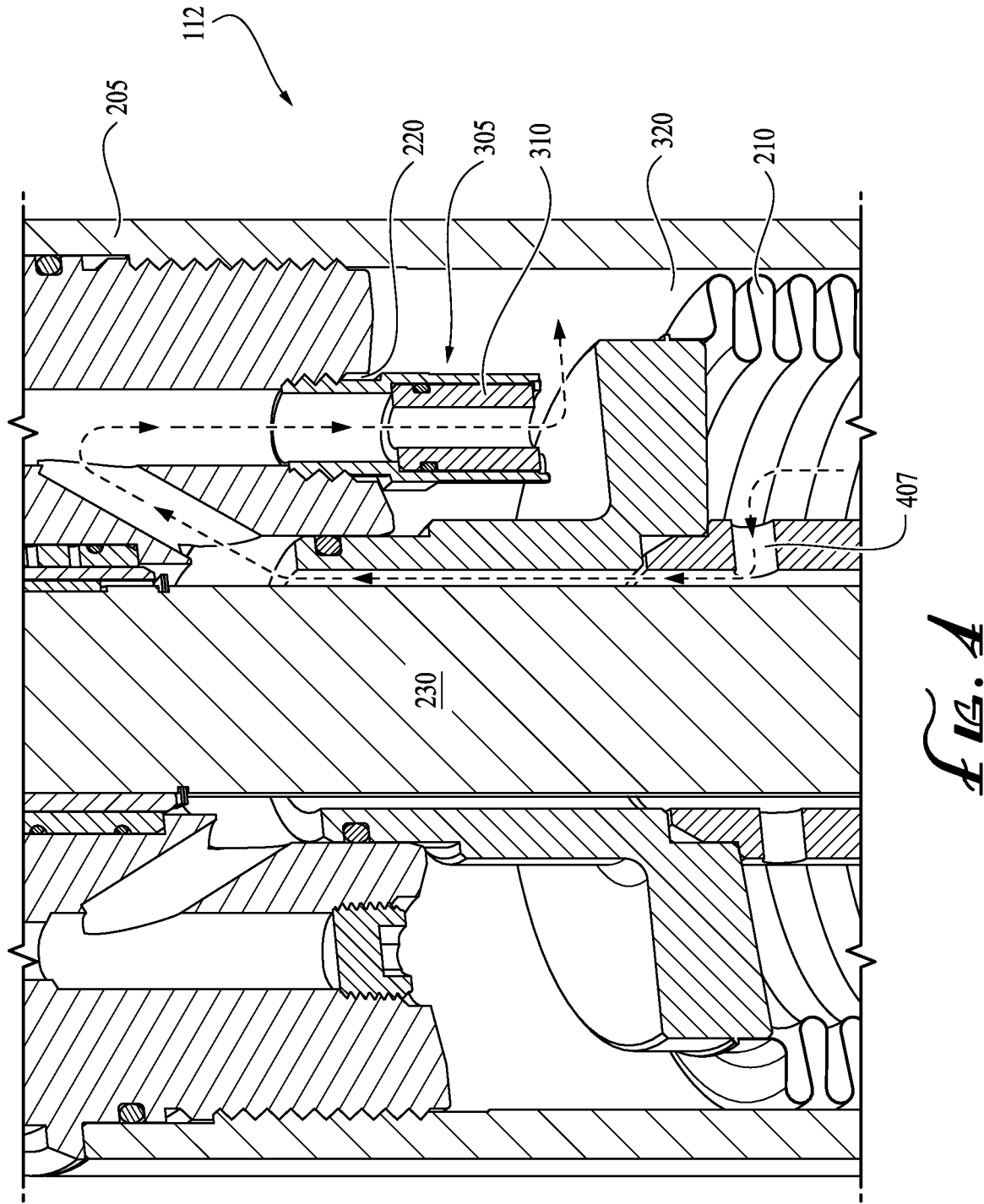
FIG. 4 is a schematic of an enlarged cross-section of a portion of the motor protector of FIG. 3, showing fluid flow therethrough, according to an embodiment.
Figure 5:
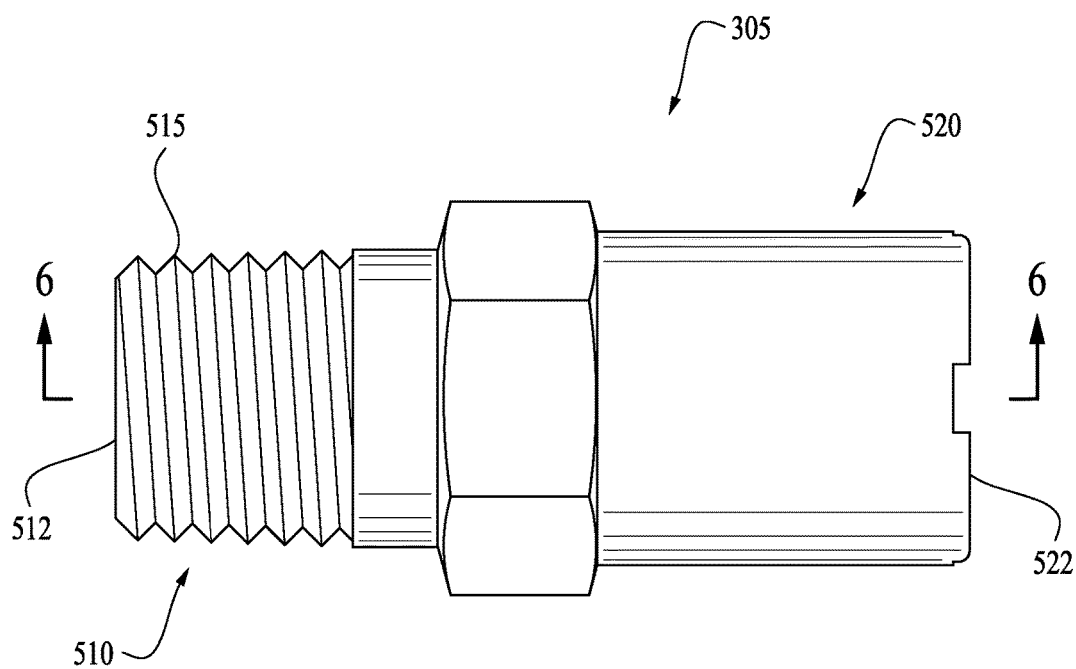
FIG. 5 is a side elevation view of an exemplary check valve adapter, according to an embodiment.
Figure 6:
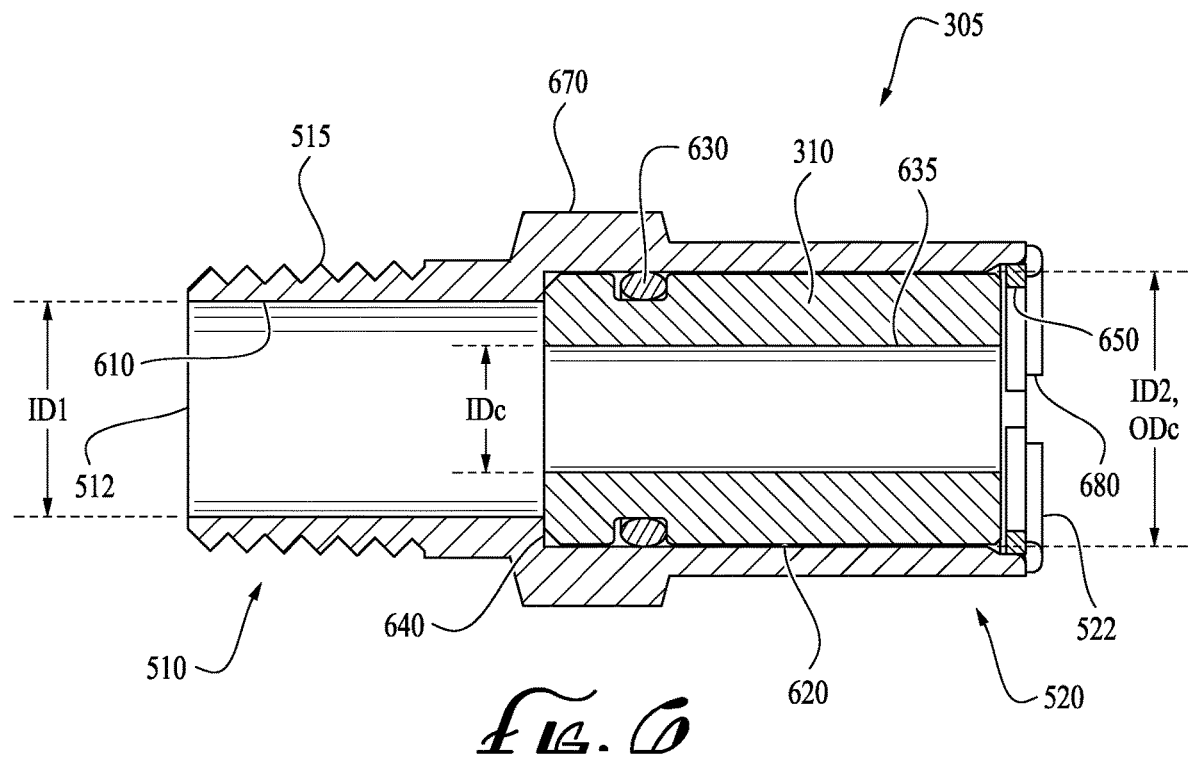
FIG. 6 is a cross-sectional view of the adapter of FIG. 5, with an exemplary cartridge-style check valve disposed therein, according to an embodiment.
Figure 7:
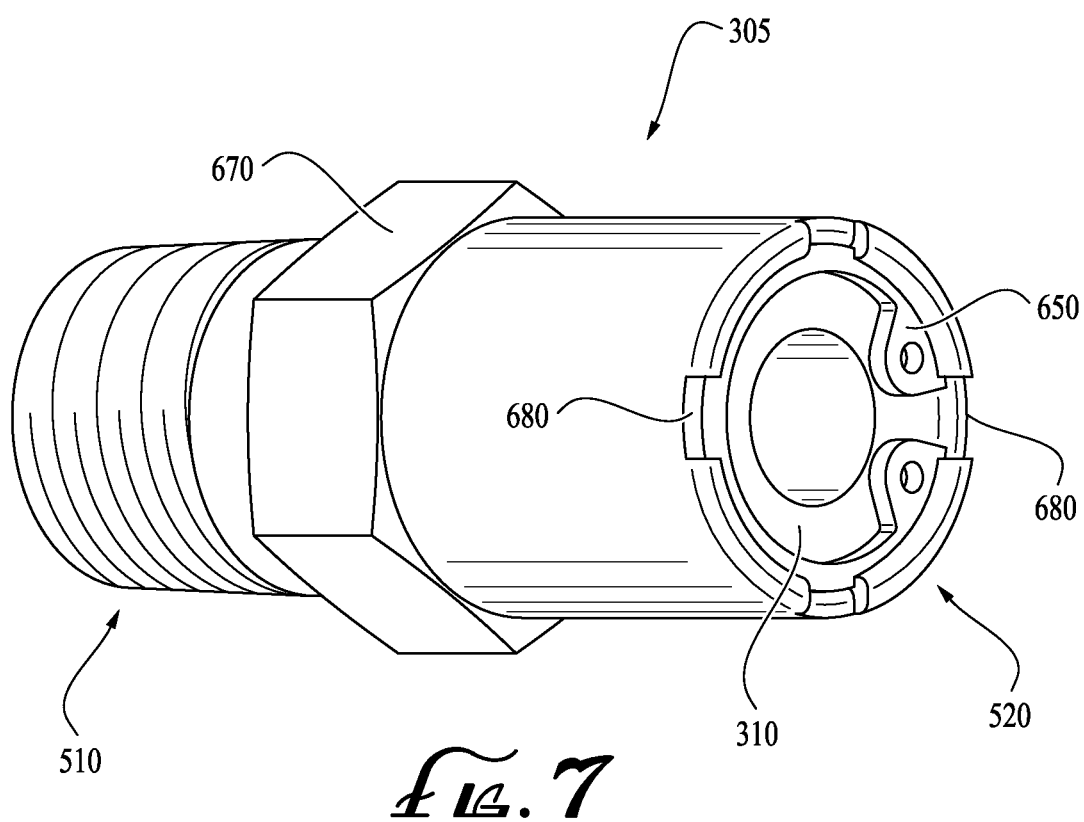
FIG. 7 is a second end isometric view of the adapter of FIG. 6, according to an embodiment.

FIGS. 5-7 illustrate an exemplary check valve adapter 305, of the sort that can be used in the NPT screw-style vent port 220 shown in FIG. 2. The adapter 305 is configured to allow the use of a cartridge-style check valve 310 in an NPT screw-style vent port 220, for example within the motor protector 112 illustrated in FIGS. 2-4. An exemplary check valve adapter 305 can comprise a first end portion 510 configured for removable (and typically sealing) attachment to an NPT screw-style vent port 220, and a second end portion 520 configured to receive a cartridge-style check valve 310 (for example, which may be configured to allow controlled fluid flow therethrough in only one direction, e.g. when pressure reaches a pre-set level). The first end portion 510 is in fluid communication with the second end portion 520. The first end portion 510 can be configured to be in fluid communication with the NPT screw-style vent port 220 (e.g. with the bore of the first end portion 510 in fluid communication with the NPT screw-style vent port 220). The second end portion 520 is configured to receive/hold/house the cartridge-style check valve 310. In embodiments, the second end portion 520 may be configured to receive/hold/house the cartridge-style check valve 310 in either direction/orientation (e.g. thereby allowing fluid flow through the adapter 305 and/or the associated vent port 220 in either direction, merely based on the orientation of the cartridge-style check valve 310 within the second end portion 520 of the adapter 305). Thus, the adapter 305 can be configured to allow the cartridge-style check valve 310 to operate in either direction/orientation and/or to allow the direction of flow through the vent port 220 to be changed (e.g. by reorienting the check valve 310 within the second end portion 520 of the adapter 305). While the embodiments are described herein with respect to NPT screw-type vent port 220 (with the first end being configured for attachment thereto, for example using NPT screw threads), other embodiments can use other screw-in style ports, which may be configured with different style threads (e.g. with the first end then being configured for attachment thereto).

As shown in FIG. 6, the first end portion 510 comprises a bore 610 therethrough, the second end portion 520 comprises a bore 620 therethrough, and the bore 610 of the first end portion 510 is in fluid communication with the bore 620 of the second end portion 520. The bore 620 of the second end portion 520 is configured to receive the cartridge-style check valve 310. For example, the bore 620 of the second end portion 520 may be substantially smooth and may have an inner diameter that is substantially the same as (or at least as large as, so as to be capable of receiving) the outer diameter of the cartridge-style check valve 310.

Typically, the second end portion 520 is configured so that, upon insertion of the cartridge-style check valve 310 into the second end portion 520 (e.g. into the bore 620 of the second end portion 520), a seal element 630 on an exterior of the cartridge-style check valve 310 seals the interface between the second end portion 520 and the cartridge-style check valve 310 (e.g. by pressing firmly/snuggly against an interior surface of the bore 620 of the second end portion 520 of the adapter 305). The seal element 630 of the cartridge-style check valve 310 may comprise an o-ring, for example disposed circumferentially around an exterior of the body of the cartridge-style check valve 310. In embodiments, the inner diameter of the second end portion 520 is approximately the same as the outer diameter of the seal element 630 of the cartridge-style check valve 310. For example, the seal element 630 outer diameter before compression can be slightly larger than the inner diameter of the bore 620 of the second end portion 520, but can be sufficiently compressible to allow insertion of the cartridge-style check valve 310 into the bore 620 of the second end portion 520 and then (when inserted) to press firmly enough against the interior surface of the bore 620 of the second end portion 520 to effectively form a seal therebetween.

In embodiments, the bore 610 of the first end portion 510 may have a smaller inner diameter than the bore 620 of the second end portion 520, forming a shoulder 640 therebetween configured for the cartridge-style check valve 310 to seat thereon upon being received in the bore 620 of the second end portion 520. For example, the inner diameter of the bore 610 of the first end portion 510 can be smaller than the outer dimeter of the cartridge-style check valve 310, such that during insertion of the cartridge-style check valve 310 into the bore 620 of the second end portion 520, the cartridge-style check valve 310 cannot enter the bore 610 of the first end portion 510, but rather seats on the shoulder 640 (since the outer diameter of the cartridge-style check valve 310 is larger than the inner diameter of the bore 610 of the first end portion 510). The cartridge-style check valve 310 may also comprise a bore 635 therethrough in some embodiments. For example, a biased valve/sealing element can be disposed within the through-bore of the cartridge-style check valve 310, with the biasing being based on the pre-set level of pressure to open the cartridge-style check valve 310. In embodiments, the bore 635 of the cartridge-style check valve 310 may have a smaller inner diameter than the inner diameter of the bore 610 of the first end portion 510, as shown in FIG. 6.

As shown in FIG. 5, the first end portion 510 may include NPT threads 515, which may be configured to (e.g. matingly and/or sealingly) removably attach to the corresponding threads on the NPT screw-style vent port 220. For example, the NPT threads 515 can be disposed on the exterior surface of the first end portion 510. A distal end 512 of the first end portion 510 can be configured for insertion into the NPT screw-style vent port 220, for example with the NPT threads 515 disposed on the distal end 512 of the first end portion 510.

In embodiments, the adapter 305 can have a retainer element (e.g. either integrally or as a separate element used therewith) which is configured to (e.g. removably) retain the cartridge-style check valve 310 axially/longitudinally within the bore 620 of the second end portion 520 of the adapter 305. For example, as shown in FIGS. 6-7, the retainer element may include a retaining ring or snap ring 650, which may be configured to be temporarily compressed to a smaller diameter, which is smaller than the inner diameter of the bore 620 of the second end portion 520, before expanding/returning towards its original larger diameter. For example, the retaining ring 650 can have a gap, along with sufficient flexibility, to allow for compression to reduce the diameter of the ring 650. Upon expansion of the retaining ring 650 towards its original (uncompressed) diameter, the retaining ring 650 may seat within/press firmly against an interior surface of the bore 620 of the second end portion 520, thereby securing the cartridge-style check valve 310 (e.g. axially/longitudinally) in place within the bore 620 of the second end portion 520. In embodiments, the bore 620 of the second end portion 520 may have a recess/groove configured to allow seating of the retainer element therein in order to removably hold the cartridge-style check valve 310 in place within the bore 620 of the second end portion 520 (e.g. by interference fit, e.g. with a portion of the retainer element projecting radially inward beyond the outer diameter of the cartridge-style check valve 310).

The retainer element may be configured to be disposed in proximity to the distal end 522 of the second end portion 520. For example, the recess/groove can be disposed in proximity to the distal end 522 of the second end portion 520, away from the first end portion 510, so that the retainer element can seat in such a distal location (which may be spaced from the shoulder 640 to allow for securement of the cartridge-style check valve 310 in the bore 620 of the second end). The retainer element (e.g. in conjunction with the recess/groove and the shoulder 640) can be configured to fix the axial/longitudinal position of the cartridge-style check valve 310 within the bore 620 of the second end portion 520 (e.g. with the cartridge-style check valve 310 held between the shoulder 640 and the retainer element). Other retainer element embodiments are also included within the scope of this disclosure. For example, the retainer element may comprise one or more radially extending set screw (e.g. configured to extend through corresponding holes in the second end portion 520, so that when tightened, the set screw extends radially into the bore 620 of the second end portion 520 to provide an interference securement for the cartridge-style check valve 310 disposed therein).

Some retainer embodiments may also include a tightening/gripping feature 670 (e.g. on the exterior of the adapter 305) configured to assist in screwing/inserting the first end portion 510 of the adapter 305 into the NPT screw-style vent port 220. In embodiments, the gripping feature 670 may be configured with at least two (e.g. substantially flat) gripping surfaces, which may typically be disposed opposite one another. In embodiments, the gripping feature 670 may be configured for use with a wrench and/or socket wrench tool. For example, the gripping feature 670 may have a bolt and/or hexagonal shaped exterior surface. In embodiments, the gripping feature 670 may have a thicker wall than the first end portion 510 and/or the second end portion 520. In some embodiments, the gripping feature 670 can be disposed between the first end portion 510 and the second end portion 520, in proximity axially to the shoulder 640, and/or at the axial interface between the first and second end portions.

As shown in FIG. 5, the first end portion 510 can be a substantially cylindrical body, and the second end can be a substantially cylindrical body. The first end portion 510 and the second end portion 520 may be coupled/fixed together at their proximal ends, for example axially end-to-end with their bores aligned along a common central/longitudinal axis. In embodiments, an outer diameter of the first end portion 510 may be less than an outer diameter of the second end portion 520 (although in other embodiments, the outer diameters may be approximately equal or the outer diameter of the first portion could be larger than the outer diameter of the second portion). In embodiments, a wall thickness of both the first end portion 510 and the second end portion 520 are sufficient to withstand the maximum pressure expected to be experienced by the check valve (e.g. the pre-set level of pressure, typically plus a safety factor). In some embodiments, the wall thickness of the first end portion 510 can be approximately the same as wall thickness of the second end portion 520.

In some embodiments, the second end portion 520 may comprise a flow feature configured to allow flow (e.g. radially) between the bore of the second end portion 520 and an exterior environment (e.g. outside of the bore of the second end), for example in the event that the distal end 522 of the bore 620 of the second end portion 520 is blocked. The flow feature may be disposed in proximity to the distal end 522 of the second end portion 520. In embodiments, the flow feature can extend radially from the bore 620 of the second end portion 520 to an exterior surface of the second end portion 520 (e.g. from the inner diameter of the second end portion 520 to the outer diameter of the second end portion 520). As shown in FIG. 5, the flow feature can include one or more slots 680 (e.g. milled cut-outs), which may be disposed at the distal end 522 of the second end portion 520 and may extend radially from the bore 620 of the second end portion 520 outward to its exterior surface. Alternate embodiments of the flow feature may include one or more radially extending holes.

In embodiments, the adapter 305 can be integrally formed as a unitary body (e.g. formed of a single milled piece of machined metal/steel). For example, the first end portion 510 and the second end portion 520 may be portions of a single unitary body that is integrally formed (such that they are not separate components that have been joined/coupled). The unitary body can be substantially cylindrical and can have a bore therethrough (although the diameter of the bore may vary, for example between the first end portion 510 and the second end portion 520, and the outer diameter/surface of the unitary adapter body may vary along its length). In alternate embodiments, the first end portion 510 and the second end portion 520 may be separately formed and then coupled together (e.g. by welding, threading, etc.).

In embodiments, the adapter 305 can be formed of steel (such as stainless steel), bronze, and/or plastic. For example, both the first end portion 510 and the second end portion 520 can be formed of the same material, such as steel (e.g. stainless steel), bronze, or plastic.

A cartridge-style check valve 310 can be disposed in the bore of the second end portion 520 of the adapter 305. In embodiments, the cartridge-style check valve 310 can be configured to allow controlled fluid flow therethrough in only one direction (e.g. when pressure reaches a pre-set level). For example, the pre-set level of the cartridge-style check valve 310 can be approximately 25 psi or approximately 5-25, 5-50, 25-50, 15-25, 15-40, or 25-35 psi. The cartridge-style check valve 310 typically has an exterior seal element 630 disposed circumferentially around its body, which is configured to seal the interface between the second end portion 520 of the adapter 305 and the cartridge-style check valve 310, and a bore 635 extending longitudinally through the body of the cartridge-style check valve 310. A biased valve/sealing element can be disposed within the bore 635 of the cartridge-style check valve 310, and the biasing typically is based on the pre-set level for the cartridge-style check valve 310. In some embodiments, the bore 635 of the cartridge-style check valve 310 may have a smaller inner diameter than the inner diameter of the bore 610 of the first end portion 510. The body of the cartridge-style check valve 310 may be substantially cylindrical/tubular, for example with its outer diameter approximately the same as the inner diameter of the bore of the second end portion 520 of the adapter 305. The exterior surface of the cartridge-style check valve 310 may be substantially smooth (for example without any threading).

Figure 3:
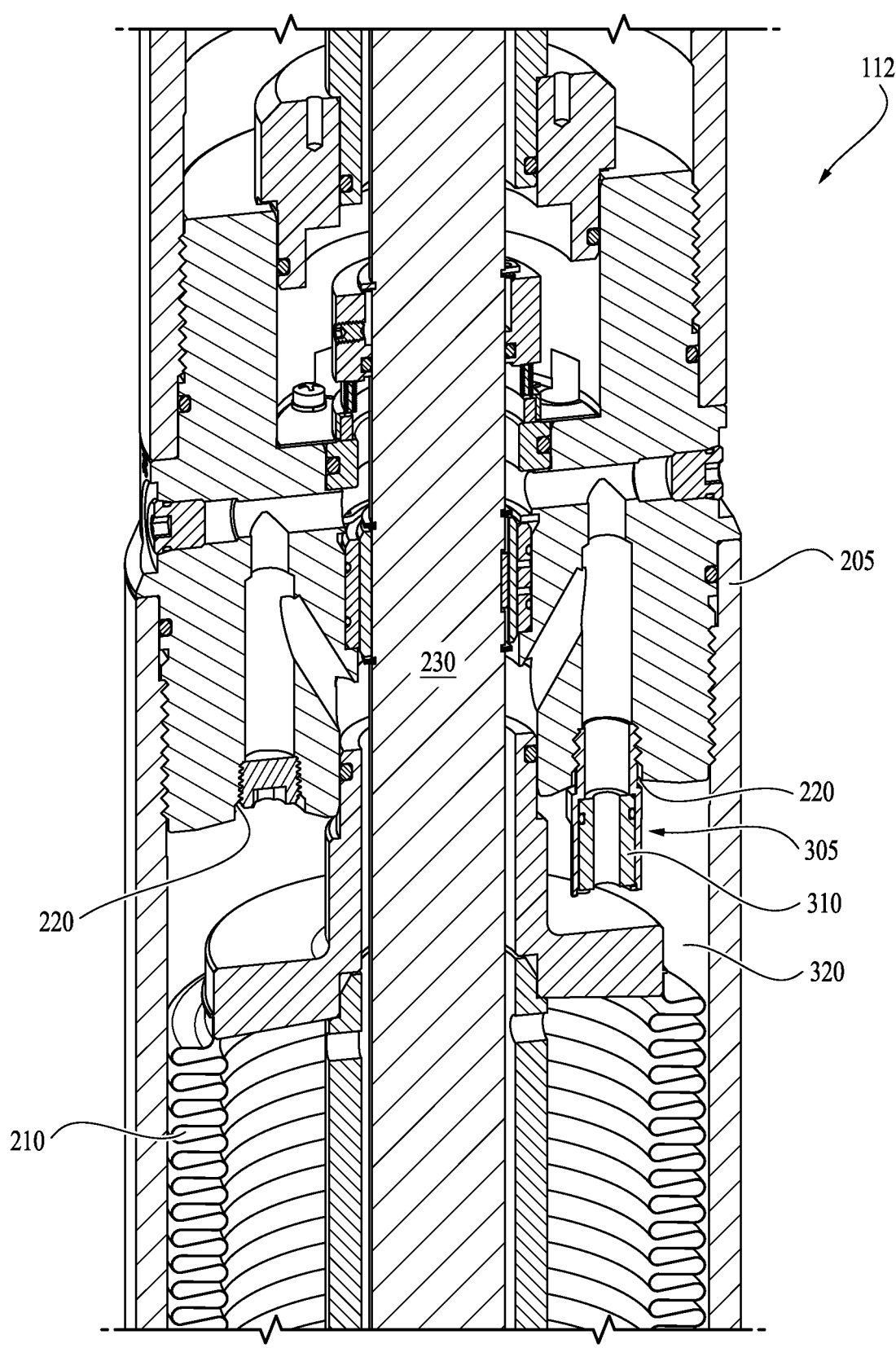
FIG. 3 is an enlarged cross-section of a portion of the motor protector of FIG. 2, according to an embodiment.

FIG. 4 illustrates an exemplary fluid flowpath in the motor protector 112, for example having a cartridge-style check valve 310 in an adapter 305 disposed within an NPT screw-style vent port 220. For example, the motor protector 112 can include a seal assembly having the one or more NPT screw-style vent port 220 (e.g. in a fluid flowpath) and the corresponding adapter 305 disposed therein. FIGS. 3-4 illustrate the motor protector 112 with the expandable element 210 in proximity to its maximum extension. As shown in FIG. 4, the expandable element 210 may be supported on the shaft 230, for example by a support element. There may be a passage 407 extending radially, for example through the support element. The interior space of the expandable element 210 may be configured to only be in fluid communication with the passage 407 when the expandable element 210 is near its maximum (e.g. axial/longitudinal) expansion. For example, as the expandable element 210 expands upwards, it may clear the passage 407, providing fluid communication therebetween. This may provide fluid communication (e.g. for venting, for example to prevent pressure build-up) between the interior space of the expandable element 210 and a radial space located between the shaft 230 and the expandable element 210.

The radial space may be in fluid communication with the NPT screw-style vent port 220 as shown by the exemplary schematic flow diagram in FIG. 4 (with the dotted arrows illustrating an exemplary fluid flow). Due to seals around the shaft 230, oil entering the radial space from the expandable element 210 (e.g. through the one or more passage 407) may flow and/or be directed (e.g. through tubes, conduits, or other passageways) to the NPT screw-style vent port 220. In FIG. 4, the cartridge-style check valve 310 is oriented in the adapter 305 (and the NPT screw-style vent port 220) to provide one-way fluid flow from the expandable element 210 to the external environment (e.g. through the radial space and associated passageways), allowing venting of oil (for example to prevent excessive pressure build-up in the expandable element 210). In some embodiments, the one or more NPT screw-style vent port 220 may provide the only fluid communication pathway between the expandable element 210 and the external environment through the seal assembly.

Figure 8:
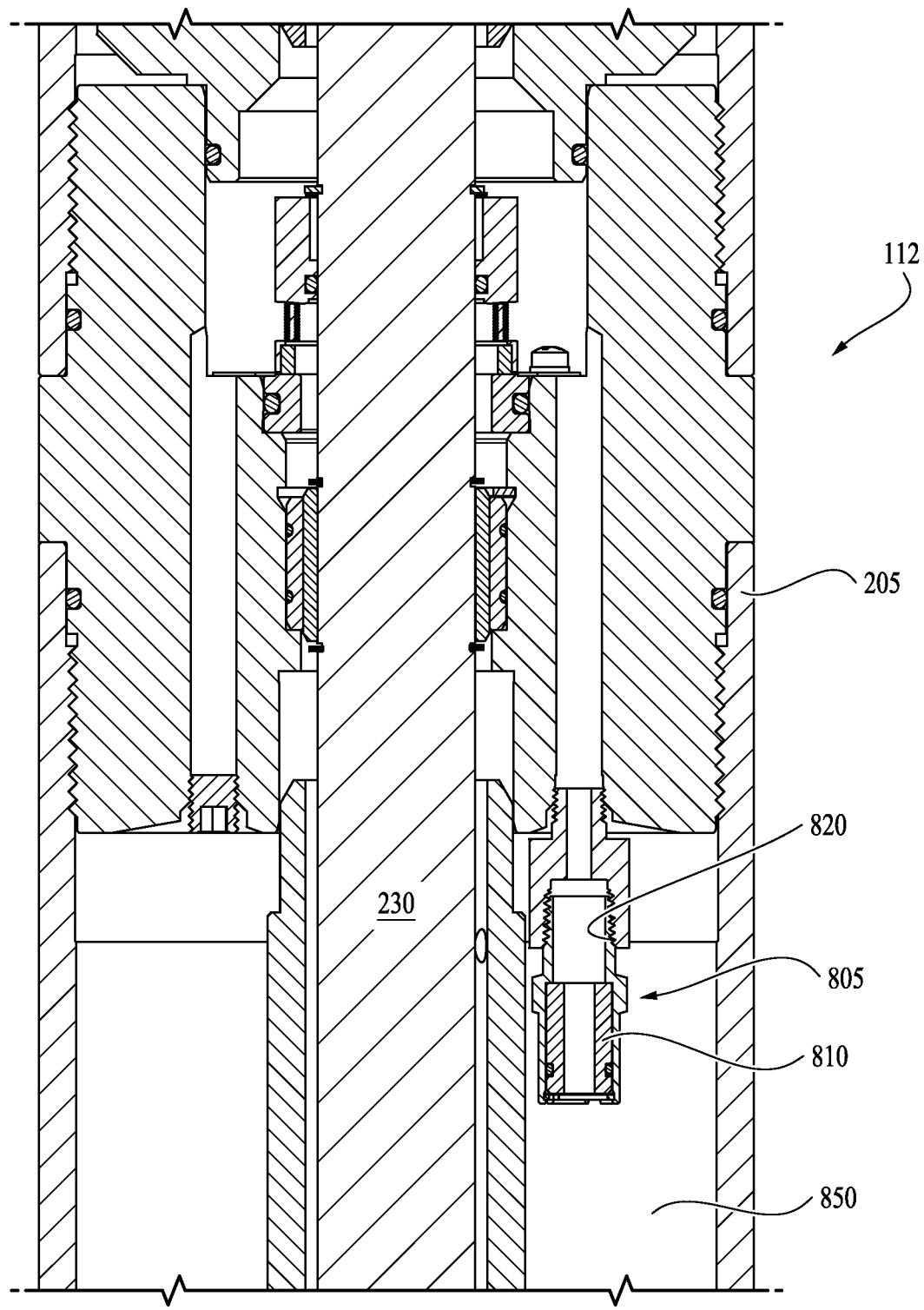
FIG. 8 is an enlarged cross-section of another portion of the motor protector of FIG. 2, according to an embodiment.
Figure 9:
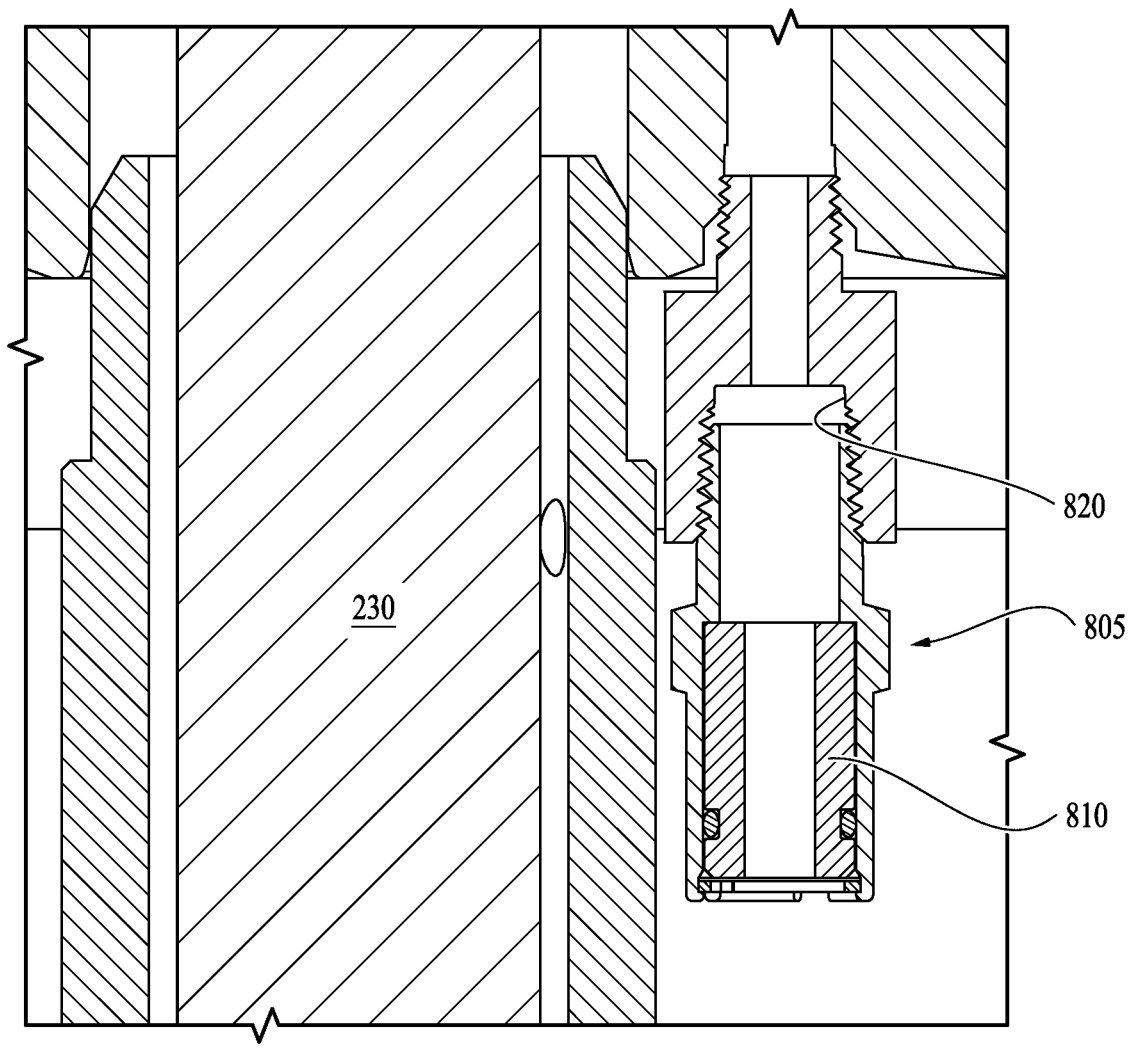
FIG. 9 is an enlarged portion of FIG. 8, illustrating an exemplary cartridge-style check valve (e.g. oriented the opposite direction from that shown in FIG. 4) in an exemplary adapter in an exemplary NPT screw-style port, according to an embodiment.

FIGS. 8-9 illustrate an exemplary alternate use of adapter embodiments within an exemplary motor protector 112, for example for different flow control. The alternate usage of the cartridge-style check valve, adapter, and NPT screw-style port described in FIGS. 8-9 may be used alone or in conjunction with the primary flow usage described with respect to FIG. 4. In some embodiments, the adapter embodiments can be used in more than one location. For example, the motor protector 112 may have multiple NPT screw-style vent ports, and multiple adapters may be used therein. FIG. 2 illustrates such an example, showing the use of one adapter 305 in a top portion/section of the motor protector 112 as shown in the example of FIGS. 3-4, and a second adapter 805 in a bottom portion/section of the motor protector 112 as shown in FIGS. 8-9.

With respect to FIGS. 8-9, the motor protector 112 may have a second NPT screw-style vent port 820, a second check valve adapter 805 (e.g. disposed within the second NPT screw-style vent port 820), and a second cartridge-style check valve 810 (e.g. disposed within the second end portion of the second adapter 805). In embodiments, the first and second adapters 305, 805 can be substantially identical, the first and second NPT screw-style vent ports 220, 820 can be substantially identical, and the first and second cartridge-style check valves 310, 810 can be substantially identical. In embodiments, the first adapter 305 and the second adapter 805 can have corresponding check valves disposed therein in the opposite orientation/direction. For example, the second NPT screw-style vent port 820 may be configured to provide fluid communication between a bottom portion of the motor protector 112 (e.g. a bottom chamber 850 in the housing 205, typically located below the expandable element 210) and the exterior space 320 between the expandable element 210 and the housing 205, with the second cartridge-style check valve 810 (disposed in the second NPT screw-style port 820 using the second adapter 805) being configured to vent excess wellbore fluids in the bottom chamber 850 to prevent fluid back-up into the motor 110 (e.g. upon reaching a second pre-set level of pressure). In some embodiments, the second pre-set level can be approximately the same as the first pre-set level (although in other embodiments, the pre-set level of the second cartridge-style check valve 810 may be different than the pre-set level of the first cartridge-style check valve 310).

In embodiments, the second NPT screw-style port 820, the second adapter 805, and the second cartridge-style check valve 810 may be configured to act as a failsafe, so that if the bottom chamber 850 fills with wellbore fluids, wellbore fluids are vented before there is back-up of wellbore fluids into the motor 110. For example, the bottom portion/chamber 850 may have wellbore fluid therein and may be configured so that pressure in excess of the second pre-set level may cause the wellbore fluid to back-up into the motor. By venting through the second NPT screw-style vent port 820, the motor 110 can be protected. In some embodiments there may be only one second NPT screw-style vent port 820 (and associated adapter 805 and check valve 810), configured to vent to the exterior space; but in other embodiments there may be more than one such second NPT screw-style vent port 820, each with corresponding adapter 805 and cartridge-style check valve 810. It should also be understood that an actual NPT screw-in type check valve may be used in any of the NPT screw-style vent ports (e.g. directly and/or without the need for the adapter). For example, one NPT screw-style vent port within the motor protector 112 can have an NPT screw-in style check valve, while another NPT screw-style vent port can have a cartridge-style check valve using a corresponding adapter.

Although the particular embodiments of the adapter may be described with respect to a motor protector 112 and/or an ESP assembly 106, the disclosed adapters are not so limited, and may be used in other situations (for example, within any port configured for NPT screw-in style attachment). For example, similar adapters can be used to allow operation of a cartridge-style check valve within a port configured for screw-in attachment, regardless of the specific location or device.

Disclosed embodiments also include methods relating to the disclosed adapter embodiments. For example, a method of controlling fluid flow in a motor protector 112/seal unit of an ESP assembly 106 can comprise: determining a desired direction of flow through an NPT screw-style vent port 220 (e.g. of a motor protector 112 or an ESP assembly 106); orienting a cartridge-style check valve 310 with respect to an adapter 305 (e.g. which is configured for removable attachment to the NPT screw-style vent port 220) responsive to the determination; removably retaining the cartridge-style check valve 310 in the adapter 305 (e.g. in the orientation); and removably retaining the adapter 305 within the NPT vent port 220. Method embodiments may further comprise providing fluid flow (e.g. oil from an expandable element 210 of the motor protector 112) through the NPT screw-style vent port 220 in a first flow direction.

In embodiments, the adapter 305 may be configured to receive the cartridge-style check valve 310 (which can be configured to allow fluid flow therethrough in only one direction, for example in response to pressure reaching a pre-set level) in either orientation/direction, allowing for flow direction change therethrough (e.g. by changing the orientation of the cartridge-style check valve 310). In embodiments, the method may further comprise: removing the cartridge-style check valve 310 from the adapter 305; reorienting the cartridge-style check valve 310 (e.g. the opposite direction) with respect to the adapter 305 (or a substantially identical adapter); and retaining the re-oriented cartridge-style check valve 310 in the adapter 305. In some embodiments, the adapter 305 may be removed from the NPT screw-style port before the cartridge-style check valve 310 is removed therefrom, and then may be reattached to the NPT screw-style vent port 220 after the reorientation. In embodiments, upon reorientation, fluid (such as oil or wellbore fluid) flows through the NPT screw-style vent port 220 in a second direction (e.g. opposite the first), which may provide fluid flow through the NPT screw-style vent port 220 in the second direction.

In embodiments, removably retaining the cartridge-style check valve 310 may comprise inserting the cartridge-style check valve 310 into (e.g. a bore of) a second end portion 520 of the adapter 305; and using a retainer element to axially fix the cartridge-style check valve 310 within the adapter 305. In embodiments, inserting the cartridge-style check valve 310 may comprise seating the cartridge-style check valve 310 on a shoulder 640 (e.g. within the bore of the adapter 305, as described herein). Embodiments may further comprise removing the adapter 305 from the NPT screw-style vent port 220, and removably attaching (e.g. screwing-in) an NPT screw-style check valve in the same NPT screw-style vent port 220 (without any alteration or modification). This demonstrates that the adapter 305 allows the same NPT screw-style port to be used with both NPT screw-in style check valves (directly, without any adapter) and cartridge-style check valves (e.g. with the adapter 305), providing added functionality and flexibility. Similarly, embodiments may comprise removing an NPT screw-style check valve from the NPT screw-style vent port 220, and removably attaching the adapter 305 to the same NPT screw-style vent port 220 (which may then allow for insertion of a cartridge-style check valve 310 in the NPT screw-style vent port 220).

In embodiments, the NPT screw-style vent port 220 may provide fluid communication between an expandable element 210 of the motor protector 112 (e.g. an internal space of the expandable element 210, which may contain motor oil and/or be in fluid communication with the motor 110 of an ESP assembly 106, for example receiving oil from the motor 110) and an external environment (e.g. the wellbore and/or an exterior space between the expandable element 210 and a housing 205 of the motor protector 112 which is in fluid communication with the external environment). The cartridge-style check valve 310 may be oriented in the adapter 305 (with the adapter 305 disposed in the NPT screw-style vent port 220) to allow venting of fluid (such as oil) from the expandable element 210 to the external environment (and to prevent fluid flow from the external environment to the expandable element 210). Thus, method embodiments may comprise orienting the cartridge-check valve in the adapter 305 to provide one-way flow of oil from the expandable element 210 to the external environment, for example when the pressure in the expandable element 210 exceeds the pre-set level. Embodiments may further comprise venting oil through the cartridge-style check valve 310 in the event/responsive to heated oil (e.g. of a motor 110 of the ESP assembly) expanding beyond the limit of the expandable element 210 (e.g. when pressure in the expandable element 210 reaches a pre-set limit/level, for example due to heating of the oil therein). The pre-set level typically is set to prevent large pressure differential. By way of example, the pre-set level can be approximately 25 psi or approximately 5-25, 5-50, 25-50, 15-25, 15-40, 10-25, 10-20, 15-25, 15-20, or 25-35 psi. In embodiments, the motor protector 112/seal unit experiences temperatures of approximately 350-400, 350-550, 400-550, 450-550, or 500-550 degrees Fahrenheit.

In embodiments in which the motor protector 112 further comprises a second NPT screw-style vent port 820, for example configured to vent wellbore fluids from a bottom section/chamber 850 of the motor protector 112 to the exterior space 320 of the motor protector 112 (e.g. between the expandable element 210 and the housing 205) (e.g. to prevent back-up of wellbore fluids into a motor 110 coupled to the motor protector 112), the method may further comprise orienting a second cartridge-style check valve 810 in a second adapter 805; removably retaining the second cartridge-style check valve 810 in the second adapter 805; and removably retaining the second adapter 805 in the second NPT screw-style vent port 820. In embodiments, the second adapter 805 may be substantially identical to the first adapter 305, the second cartridge-style check valve 810 may be substantially the same as the first cartridge-style check valve 310, and the second NPT screw-style vent port 820 may be substantially the same as the first NPT screw-style vent port 220. In embodiments, the second cartridge-style check valve 810 orientation may be opposite the first cartridge-style check valve 310 orientation. Some method embodiments may comprise removing the second adapter 805 from the second NPT screw-type vent port 820, and removably attaching (e.g. screwing-in) a second NPT screw-style check valve in the second NPT screw-style vent port 820 (e.g. without any alteration or modification). Some method embodiments may comprise removing a second NPT screw-style check valve from the second NPT screw-style vent port 820, and removably attaching the second adapter 805 to the second NPT screw-style vent port 820 (which may then allow for insertion of the second cartridge-style check valve 810 in the second NPT screw-style vent port 820).

Additional Disclosure

The following are non-limiting, specific embodiments in accordance with the present disclosure:

In a first embodiment, a check valve adapter, for example for a motor protector of an electrical submersible pump assembly, can comprise: a first end portion configured for removable (and typically sealing) attachment to an NPT screw-style vent port (or in some embodiments, to some other screw-in style port—i.e. a port having screw threads configured to allow screw-in attachment of an element having corresponding/mating screw threads); a second end portion configured to (typically sealingly) receive a cartridge-style check valve (for example, which may be configured to allow controlled fluid flow therethrough in only one direction, e.g. when pressure reaches a pre-set level); wherein the first end portion is in fluid communication with the second end portion; and wherein the second end portion is configured to receive/hold/house the cartridge-style check valve in either direction (e.g. thereby allowing fluid flow through the vent port in either direction merely based on the orientation of the cartridge-style check valve within the second end portion of the adapter).

A second embodiment can include the adapter of the first embodiment, wherein the adapter is configured to allow the cartridge-style check valve to operate in either direction and/or to allow the direction of flow to be changed (e.g. by reorienting the check valve within the second end portion).

A third embodiment can include the adapter of the first or second embodiment, wherein the first end portion comprises a bore therethrough, the second end portion comprises a bore therethrough, and the bore of the first end portion is in fluid communication with the bore of the second end portion.

A fourth embodiment can include the adapter of the third embodiment, wherein the bore of the second end portion is configured to receive the cartridge-style check valve—for example, the bore of the second end portion may be substantially smooth and may have an inner diameter that is substantially the same as (or at least as large as) the outer diameter of the cartridge-style check valve (e.g. an external seal element of the cartridge-style check valve).

A fifth embodiment can include the adapter of any one of the first to fourth embodiments, wherein the second end portion is configured so that, upon insertion of the cartridge-style check valve into the second end portion (e.g. into the bore of the second end portion), a seal element on an exterior of the cartridge-style check valve seals the interface between the second end portion and the cartridge-style check valve (e.g. by pressing firmly/snuggly against an interior surface of the bore of the second end of the adapter).

A sixth embodiment can include the adapter of the fifth embodiment, wherein the seal element comprises an o-ring disposed circumferentially around an exterior of the cartridge-style check valve.

A seventh embodiment can include the adapter of the fifth or sixth embodiment, wherein an inner diameter of the second end portion is approximately the same as the outer diameter of the seal element of the cartridge-style check valve (e.g. the seal element outer diameter before compression is slightly larger than the inner diameter of the bore of the second end portion, but is sufficiently compressible to allow insertion of the cartridge-style check valve into the bore of the second end portion and then (when inserted) to press firmly enough against the interior surface of the bore of the second end portion to effectively form a seal therebetween).

An eighth embodiment can include the adapter of any one of the third to seventh embodiments, wherein the bore of the first end portion has a smaller inner diameter than the bore of the second end portion and/or the inner diameter of the bore of the first end portion is smaller than the outer dimeter of the cartridge-style check valve, forming a shoulder therebetween configured for the cartridge-style check valve to seat thereon upon being received in the bore of the second end portion (e.g. such that during insertion of the cartridge-style check valve into the bore of the second end portion, the cartridge-style check valve cannot enter the bore of the first end portion (but seats on the shoulder), since the outer diameter of the cartridge-style check valve is larger than the inner diameter of the bore of the first end portion).

A ninth embodiment can include the adapter of any one of the third to eighth embodiments, wherein the cartridge-style check valve comprises a bore therethrough (e.g. with a biased valve/sealing element disposed therein, wherein the biasing is based on the pre-set level of pressure to open the cartridge-style check valve), and the bore of the cartridge-style check valve has a smaller inner diameter than the inner diameter of the bore of the first end portion.

A tenth embodiment can include the adapter of any one of the first to ninth embodiments, wherein (e.g. an exterior of) the first end portion comprises NPT threads, which may be configured to (e.g. matingly and/or sealingly) removably attach to the corresponding threads on the NPT screw-style vent port.

An eleventh embodiment can include the adapter of any one of the first to tenth embodiments, wherein a distal end of the first end portion is configured for insertion into the NPT screw-style vent port.

A twelfth embodiment can include the adapter of any one of the third to seventh embodiments, further containing a retainer element configured to (e.g. removably) retain the cartridge-style check valve (e.g. axially/longitudinally) within the bore of the second end portion of the adapter.

A thirteenth embodiment can include the adapter of the twelfth embodiment, wherein the retainer element comprises a retaining ring or snap ring (e.g. configured to be temporarily compressed to a smaller diameter (e.g. by having a gap in the ring and sufficient flexibility), which is smaller than the inner diameter of the bore of the second end portion, before expanding/returning towards its original larger diameter), which may for example allow it to seat within/press firmly against the interior surface of the bore of the second end portion or a recess/groove in the second end portion configured to receive the ring, thereby securing the cartridge-style check valve (e.g. axially/longitudinally) in place within the bore of the second end portion.

A fourteenth embodiment can include the adapter of any one of the twelfth to thirteenth embodiments, wherein the bore of the second end portion comprises a recess/groove configured to allow seating of the retainer element therein in order to removably hold the cartridge-style check valve in place within the bore of the second end portion (e.g. by interference fit, e.g. with a portion of the retainer element projecting radially inward beyond the outer diameter of the cartridge-style check valve).

A fifteenth embodiment can include the adapter of any one of the twelfth to fourteenth embodiments, wherein the retainer element is configured to be disposed in proximity to the distal end of the second end portion (e.g. the recess/groove is disposed in proximity to the distal end of the second end portion, away from the first end portion).

A sixteenth embodiment can include the adapter of any one of the twelfth to fifteenth embodiments, wherein the retainer element (e.g. in conjunction with the recess/groove and the shoulder) is configured to fix the longitudinal position of the cartridge-style check valve within the bore of the second end portion (e.g. with the cartridge-style check valve held between the shoulder and the retainer element).

A seventeenth embodiment can include the adapter of the twelfth embodiment, wherein the retainer element comprises one or more radially extending set screw (e.g. configured to extend through corresponding holes in the second end portion, so that when tightened, the set screw extends radially into the bore of the second end portion to provide an interference securement for the cartridge-style check valve disposed therein).

An eighteenth embodiment can include the adapter of any one of the first to seventeenth embodiments, further comprising a tightening/gripping feature (e.g. on the exterior of the adapter) configured to assist in screwing/inserting the first end portion of the adapter into the NPT screw-style vent port.

A nineteenth embodiment can include the adapter of the eighteenth embodiment, wherein the gripping feature is configured with at least two (e.g. substantially flat) gripping surfaces (e.g. typically disposed opposite one another).

A twentieth embodiment can include the adapter of any one of the eighteenth to nineteenth embodiments, wherein the gripping feature is configured for use with a wrench and/or socket wrench tool.

A twenty-first embodiment can include the adapter of any one of the eighteenth to twentieth embodiments, wherein the gripping feature comprises a bolt and/or hexagonal shaped exterior surface.

A twenty-second embodiment can include the adapter of any one of the eighteenth to twenty-first embodiments, wherein the gripping feature comprises a thicker wall than the first end portion and/or the second end portion.

A twenty-third embodiment can include the adapter of any one of the eighteenth to twenty-second embodiments, wherein the gripping feature is disposed between the first end portion and the second end portion (e.g. in proximity axially to the shoulder) and/or at the axial interface between the first and second end portions.

A twenty-fourth embodiment can include the adapter of any one of the first to twenty-third embodiments, wherein the first end portion is a substantially cylindrical body and the second end is a substantially cylindrical body (e.g. which may be coupled/fixed together at their proximal ends, for example axially end-to-end with their bores aligned along a common central/longitudinal axis).

A twenty-fifth embodiment can include the adapter of any one of the first to twenty-fourth embodiments, wherein an outer diameter of the first end portion is less than an outer diameter of the second end portion.

A twenty-sixth embodiment can include the adapter of any one of the first to twenty-fifth embodiments, wherein a wall thickness of both the first end portion and the second end portion are sufficient to withstand the maximum pressure experienced by the check valve (e.g. the pre-set level of pressure, typically plus a safety factor).

A twenty-seventh embodiment can include the adapter of any one of the first to twenty-sixth embodiments, wherein wall thickness of the first end portion is approximately the same as wall thickness of the second end portion.

A twenty-eighth embodiment can include the adapter of any one of the first to twenty-seventh embodiments, wherein the second end portion comprises a flow feature configured to allow flow (e.g. radially) between the bore of the second end portion and an exterior environment (e.g. outside of the bore of the second end), for example in the event that the distal end of the bore of the second end portion is blocked.

A twenty-ninth embodiment can include the adapter of the twenty-eighth embodiment, wherein the flow feature is disposed in proximity to the distal end of the second end portion.

A thirtieth embodiment can include the adapter of any one of the twenty-eighth to twenty-ninth embodiments, wherein the flow feature extends radially from the bore of the second end portion to an exterior surface of the second end portion (e.g. from the inner diameter of the second end portion to the outer diameter of the second end portion).

A thirty-first embodiment can include the adapter of any one of the twenty-eighth to thirtieth embodiments, wherein the flow feature comprises one or more slots (e.g. milled cut-outs)

A thirty-second embodiment can include the adapter of any one of the twenty-eighth to thirtieth embodiments, wherein the flow feature comprises one or more radially extending holes.

A thirty-third embodiment can include the adapter of any one of the first to thirty-second embodiments, wherein the adapter is integrally formed as a unitary body (e.g. formed of a single milled piece of machined metal/steel) (e.g, wherein the first end portion and the second end portion are portions of a single unitary body that is integrally formed, and are not separate components that have been joined/coupled).

A thirty-fourth embodiment can include the adapter of the thirty-third embodiment, wherein the unitary body is substantially cylindrical having a bore therethrough (although the diameter of the bore may vary, for example between the first end portion and the second end portion, and the outer diameter/surface of the adapter may vary along its length).

A thirty-fifth embodiment can include the adapter of any one of the thirty-third to thirty-fourth embodiments, wherein the unitary body of the adapter and/or the first end portion and the second end portion comprise (e.g. are formed of) steel (such as stainless steel), bronze, or plastic.

A thirty-sixth embodiment can include the adapter of any one of the first to thirty-fifth embodiments, wherein both the first end portion and the second end portion comprise (e.g. are formed of) steel (such as stainless steel), bronze, or plastic.

A thirty-seventh embodiment can include the adapter of any one of the first to thirty-sixth embodiments, wherein the adapter is configured to allow an interference/squeeze fit cartridge-style check valve to operate in an NPT screw-style vent port (e.g. to allow an NPT screw-style vent port to receive a cartridge-style check valve).

A thirty-eighth embodiment can include the adapter of any one of the first to thirty-seventh embodiments, wherein the adapter is configured to allow a cartridge-style check valve to be used in either direction within the vent port and/or to have its direction changed within the vent port (e.g. merely by flipping/reorienting it).

A thirty-ninth embodiment can include the adapter of any one of the first to thirty-eighth embodiments, further comprising a cartridge-style check valve disposed in the bore of the second end portion.

A fortieth embodiment can include the adapter of any one of the first to thirty-ninth embodiments, wherein the pre-set level is approximately 25 psi or approximately 5-25, 5-50, 25-50, 15-25, 15-40, or 25-35 psi.

In a forty-first embodiment, a motor protector/seal unit of an ESP assembly (e.g. having a motor) can comprise: a housing; an expandable element disposed within the housing and configured to expand in the event that oil in the motor expands due to heating (from the wellbore conditions and/or motor operation); one or more NPT screw-style vent port in fluid communication with the (interior space of the) expandable element and an external environment (e.g. the wellbore) (e.g. providing fluid communication between the expandable element and the external environment); and a check valve adapter for each NPT screw-style vent port, configured to (removably) receive a cartridge-style check valve and to removably couple to the corresponding NPT screw-style vent port, thereby placing the cartridge-style check valve into fluid communication with both the expandable element and the external environment (e.g. with/through the NPT screw-style vent port).

A forty-second embodiment can include the motor protector of the forty-first embodiment, wherein the external environment comprises an exterior space between the expandable element and the housing which is in fluid communication with the wellbore (e.g. the annulus of the wellbore).

A forty-third embodiment can include the motor protector of the forty-second embodiment, wherein the exterior space comprises wellbore fluid disposed therein.

A forty-fourth embodiment can include the motor protector of any one of the forty-first to forty-third embodiments, wherein the check valve adapter comprises any one selected from the first to fortieth embodiments.

A forty-fifth embodiment can include the motor protector of any one of the forty-first to forty-fourth embodiments, wherein the expandable element contains oil for the motor.

A forty-sixth embodiment can include the motor protector of any one of the forty-first to forty-fifth embodiments, wherein the expandable element comprises one or more selected from the following: an elastomeric bag or a bellows.

A forty-seventh embodiment can include the motor protector of any one of the forty-first to forty-sixth embodiments, wherein the expandable element is configured to expand axially and/or radially as oil therein expands (e.g. due to heating).

A forty-eighth embodiment can include the motor protector of any one of the forty-first to forty-seventh embodiments, wherein the expandable element is in fluid communication with the motor.

A forty-ninth embodiment can include the motor protector of any one of the forty-first to forty-eighth embodiments, further comprising a (e.g. rotational) shaft, which may be disposed in the housing, extend axially through the motor protector, and/or be configured to transmit mechanical energy from the motor to a pump of the ESP assembly through the motor protector/seal unit, wherein the expandable element is disposed around the shaft (e.g. circumferentially around the shaft and radially between the shaft and the housing).

A fiftieth embodiment can include the motor protector of any one of the forty-first to forty-ninth embodiments, further comprising a cartridge-style check valve (e.g. corresponding to each adapter) which is configured to allow controlled fluid flow therethrough in only one direction (e.g. when pressure reaches a pre-set level).

A fifty-first embodiment can include the motor protector of the fiftieth embodiment, wherein the cartridge-style check valve comprises an exterior seal element (e.g. disposed circumferentially around a body of the check valve) configured to seal the interface between the second end portion of the adapter and the cartridge-style check valve (e.g. by pressing firmly/snuggly against an interior surface of the bore of the second end of the adapter), and a bore extending longitudinally through a body of the cartridge-style check valve (e.g. with a biased valve/sealing element disposed therein, wherein the biasing is based on the pre-set level of pressure to open the cartridge-style check valve).

A fifty-second embodiment can include the motor protector of the fifty-first embodiment, wherein the bore of the cartridge-style check valve has a smaller inner diameter than the inner diameter of the bore of the first end portion.

A fifty-third embodiment can include the motor protector of any one of the fiftieth to fifty-second embodiments, wherein the pre-set level is approximately 25 psi or approximately 5-25, 5-50, 25-50, 15-25, 15-40, or 25-35 psi.

A fifty-fourth embodiment can include the motor protector of any one of the forty-first to fifty-third embodiments, further comprising a seal assembly having the one or more NPT screw-style vent port and the corresponding adapter disposed therein, wherein the one or more NPT screw-style vent port provides the only fluid communication pathway between the expandable element and the external environment through the seal assembly.

A fifty-fifth embodiment can include the motor protector of any one of the forty-first to fifty-fourth embodiments, wherein the cartridge-style check valve is oriented in the adapter (and the NPT screw-style vent port) to provide one-way fluid flow from the expandable element to the external environment.

A fifty-sixth embodiment can include the motor protector of any one of the forty-first to fifty-fifth embodiments, further comprising a labyrinth seal portion/compartment disposed within the housing (e.g. external to the expandable element), wherein the labyrinth seal portion is in fluid communication with the expandable element and the NPT screw-style vent port.

A fifty-seventh embodiment can include the motor protector of the fifty-sixth embodiment, wherein the adapter is located in proximity to the labyrinth seal portion (so as to have limited space and/or the possibility that, in some instances, the bore of the adapter may be blocked).

A fifty-eighth embodiment can include the motor protector of any one of the forty-first to fifty-seventh embodiments, further comprising a thrust bearing disposed in the housing.

A fifty-ninth embodiment can include the motor protector of any one of the forty-first to fifty-eighth embodiments, further comprising a second NPT screw-style vent port, a second check valve adapter disposed within the second NPT screw-style vent port, and a second cartridge-style check valve, wherein the first adapter and the second adapter have corresponding check valves disposed therein in the opposite orientation/direction.

A sixtieth embodiment can include the motor protector of the fifty-ninth embodiment, wherein the first and second adapters are substantially identical, the first and second NPT screw-style vent ports are substantially identical, and the first and second cartridge-style check valves are substantially identical (e.g. except oriented in opposite directions in their corresponding adapters).

A sixty-first embodiment can include the motor protector of any one of the fifty-ninth to sixtieth embodiments, wherein the second NPT screw-style vent port is configured to provide fluid communication between a bottom portion of the motor protector (e.g. a bottom chamber in the housing, typically located below the expandable element) and the exterior space between the expandable element and the housing, and wherein the second cartridge-style check valve is configured to vent excess wellbore fluids in the bottom chamber to prevent fluid back-up into the motor (e.g. upon reaching a second pre-set level of pressure).

A sixty-second embodiment can include the motor protector of the sixty-first embodiment, wherein the second pre-set level is approximately the same as the first pre-set level.

A sixty-third embodiment can include the motor protector of any one of the fifty-ninth to sixty-second embodiments, wherein the second NPT screw-style port, the second adapter, and the second cartridge-style check valve are configured to act as a failsafe, so that if the bottom chamber fills with wellbore fluids, wellbore fluids are vented before back-up into the motor.

A sixty-fourth embodiment can include the motor protector of any one of the sixty-first to sixty-third embodiments, wherein the bottom portion/chamber comprises wellbore fluid therein and is configured so that pressure in excess of a second pre-set level causes the wellbore fluid to back-up into the motor.

A sixty-fifth embodiment can include the motor protector of any one of the forty-first to fifty-eighth embodiments, further comprising one or more second NPT screw-style vent port, a second check valve adapter disposed within each second NPT screw-style vent port, and a second cartridge-style check valve disposed within each second adapter, wherein the first adapter and each second adapter have corresponding check valves disposed therein in the opposite orientation/direction, and wherein the one or more second NPT screw-style port provides the only fluid communication between a bottom portion/chamber of the motor protector and the exterior space of the motor protector.

A sixty-sixth embodiment can include the motor protector of the sixty-fifth embodiment, wherein the first adapter and the one or more second adapters are substantially identical, the first NPT screw-style vent port and the one or more second NPT screw-style vent ports are substantially identical, and the first cartridge-style check valves and the one or more second cartridge-style check valves are substantially identical (e.g. except oriented in opposite directions in their corresponding adapters).

A sixty-seventh embodiment can include the motor protector of any one of the sixty-fifth to sixty-sixth embodiments, wherein the one or more second cartridge-style check valve is configured to vent excess wellbore fluids in the bottom chamber to prevent fluid back-up into the motor.

In a sixty-eighth embodiment, a method of controlling fluid flow in a motor protector/seal unit of an ESP assembly can comprise: determining a desired direction of flow through an NPT screw-style vent port of the motor protector; orienting a cartridge-style check valve with respect to an adapter responsive to the determination (wherein the adapter is configured to receive the cartridge-style check valve in either orientation/direction, allowing for flow direction change therethrough, and is configured for removable attachment to the NPT screw-style vent port); removably retaining the cartridge-style check valve in the adapter (in the orientation); and removably retaining the adapter within the NPT vent port.

A sixty-ninth embodiment can include the method of the sixty-eighth embodiment, further comprising providing fluid flow (e.g. oil from an expandable element of the motor protector) through the NPT screw-style vent port in a first flow direction.

A seventieth embodiment can include the method of any one of the sixty-eighth to sixty-ninth embodiments, further comprising: removing the cartridge-style check valve from the adapter; reorienting the cartridge-style check valve (e.g. the opposite direction) with respect to the adapter (or a substantially identical adapter); and retaining the re-oriented cartridge-style check valve in the adapter.

A seventy-first embodiment can include the method of the seventieth embodiment, wherein, upon reorientation, fluid flows through the NPT screw-style vent port in a second direction (e.g. opposite the first), which may provide fluid flow through the NPT screw-style vent port in the second direction.

A seventy-second embodiment can include the method of any one of sixty-eighth to seventy-first embodiments, wherein removably retaining the cartridge-style check valve comprises inserting the cartridge-style check valve into (e.g. a bore of) a second end portion of the adapter (e.g. until it seats on a shoulder); and using a retainer element to axially fix the cartridge-style check valve within the adapter.

A seventy-third embodiment can include the method of any one of sixty-eighth to seventy-second embodiments, wherein inserting the cartridge-style check valve comprises seating the cartridge-style check valve on a shoulder (e.g. of the first end portion of the adapter) (e.g. within the bore of the adapter).

A seventy-fourth embodiment can include the method of any one of sixty-eighth to seventy-third embodiments, further comprising: removing the adapter from the NPT screw-style vent port; and removably attaching (e.g. screwing-in) an NPT screw-style check valve in the same NPT screw-style vent port (without any alteration or modification); and/or removing an NPT screw-style check valve from the NPT screw-style vent port, and removably attaching the adapter to the same NPT screw-style vent port.

A seventy-fifth embodiment can include the method of any one of sixty-eighth to seventy-fourth embodiments, wherein the NPT screw-style vent port provides fluid communication between an expandable element of the motor protector and an external environment (e.g. the wellbore and/or an exterior space between the expandable element and a housing of the motor protector which is in fluid communication with the external environment).

A seventy-sixth embodiment can include the method of the seventy-fifth embodiment, further comprising: venting oil through the cartridge-style check valve in the event/responsive to heated oil (e.g. of a motor of the ESP assembly) expanding beyond the limit of the expandable element (e.g. when pressure in the expandable element reaches a pre-set limit, for example due to heating of the oil therein).

A seventy-seventh embodiment can include the method of the seventy-sixth embodiment, wherein the pre-set level is approximately 25 psi or approximately 5-25, 5-50, 25-50, 15-25, 15-40, or 25-35 psi.

A seventy-eighth embodiment can include the method of any one of sixty-eighth to seventy-seventh embodiments, wherein the motor protector/seal unit experiences temperatures of approximately 350-400, 350-550, 400-550, 450-550, or 500-550 degrees Fahrenheit.

A seventy-ninth embodiment can include the method of any one of sixty-eighth to seventy-eighth embodiments, wherein the motor protector further comprises a second NPT screw-style vent port configured to vent wellbore fluids from a bottom section/chamber of the motor protector to the exterior space of the motor protector (e.g. between the expandable element and the housing) (e.g. to prevent backup of wellbore fluids into a motor coupled to the motor protector), further comprising orienting a second cartridge-style check valve in a second adapter; removably retaining the second cartridge-style check valve in the second adapter; and removably retaining the second adapter in the second NPT screw-style vent port, wherein the second adapter is substantially identical to the first adapter, wherein the second cartridge-style check valve is substantially the same as the first cartridge-style check valve, wherein the second NPT screw-style vent port is substantially the same as the first NPT screw-style vent port, and wherein the second cartridge-style check valve orientation is opposite the first cartridge-style check valve orientation.

An eightieth embodiment can include the method of the seventy-ninth embodiment, further comprising: removing the second adapter from the second NPT screw-type vent port, and removably attaching (e.g. screwing-in) a second NPT screw-style check valve in the second NPT screw-style vent port (e.g. without any alteration or modification).

An eighty-first embodiment can include the method of the seventy-ninth or eightieth embodiment, further comprising: removing a second NPT screw-style check valve from the second NPT screw-style vent port, and removably attaching the second adapter to the second NPT screw-style vent port.

In an eighty-second embodiment, an ESP assembly comprising an electric motor coupled to a pump, wherein the adapter of any one of the first to fortieth embodiments disposed in one or more component/element (e.g. the motor, the motor protector, the pump, etc.) of the ESP assembly.

In an eighty-third embodiment, an ESP assembly comprising an electric motor coupled to a pump, with the motor protector of any one of the forty-first to sixty-seventh embodiments disposed therebetween.

In an eighty-fourth embodiment, placement of the ESP assembly of the eighty-second or eighty-third embodiment in a wellbore and operation of same to pump formation fluids from the wellbore to the surface (for example, with respect to the methods as set forth in any one of the sixty-eighth to eighty-first embodiments).

While embodiments have been shown and described, modifications thereof can be made by one skilled in the art without departing from the spirit and teachings of this disclosure. The embodiments described herein are exemplary only, and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, Rl, and an upper limit, Ru, is disclosed, any number falling within the range is specifically disclosed. In particular, the following numbers within the range are specifically disclosed: R=Rl+k*(Ru−Rl), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded. The use of the terms such as "high-pressure" and "low-pressure" is intended to only be descriptive of the component and their position within the systems disclosed herein. That is, the use of such terms should not be understood to imply that there is a specific operating pressure or pressure rating for such components. For example, the term "high-pressure" describing a manifold should be understood to refer to a manifold that receives pressurized fluid that has been discharged from a pump irrespective of the actual pressure of the fluid as it leaves the pump or enters the manifold. Similarly, the term "low-pressure" describing a manifold should be understood to refer to a manifold that receives fluid and supplies that fluid to the suction side of the pump irrespective of the actual pressure of the fluid within the low-pressure manifold.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" is inclusive unless otherwise explicitly noted. Thus, the phrase "at least one of A, B, or C" is satisfied by any element from the set {A, B, C} or any combination thereof, including multiples of any element.

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. A check valve adapter for a motor protector of an electrical submersible pump assembly, comprising:
   a first end portion configured for removable attachment to an NPT screw-style vent port;
   a second end portion configured to receive a cartridge-style check valve which is configured to allow controlled fluid flow therethrough in only one direction when pressure reaches a pre-set level;
   wherein the first end portion is in fluid communication with the second end portion; and
   wherein the second end portion is configured to receive the cartridge-style check valve in either orientation, thereby allowing fluid flow through the adapter in either direction merely based on the orientation of the cartridge-style check valve within the second end portion of the adapter.

2. The adapter of claim 1, wherein:
   the first end portion comprises a bore therethrough, the second end portion comprises a bore therethrough, and the bore of the first end portion is in fluid communication with the bore of the second end portion;
   the bore of the second end portion is configured to receive the cartridge-style check valve; and
   the second end portion is configured so that, upon insertion of the cartridge-style check valve into the bore of the second end portion, a seal element on an exterior of the cartridge-style check valve seals the interface between the second end portion and the cartridge-style check valve.

3. The adapter of claim 2, wherein the bore of the first end portion has a smaller inner diameter than the bore of the second end portion, forming a shoulder therebetween configured for the cartridge-style check valve to seat thereon upon being received in the bore of the second end portion.

4. The adapter of claim 3, wherein the cartridge-style check valve comprises a bore therethrough with a biased valve element disposed therein, wherein biasing of the cartridge-style check valve is based on the pre-set level of pressure, and the bore of the cartridge-style check valve has a smaller inner diameter than the inner diameter of the bore of the first end portion.

5. The adapter of claim 1, wherein the first end portion comprises NPT threads configured to removably attach to corresponding threads on the NPT screw-style vent port, and wherein a distal end of the first end portion is configured for insertion into the NPT screw-style vent port.

6. The adapter of claim 2, further comprising a retainer element configured to removably retain the cartridge-style check valve within the bore of the second end portion of the adapter, wherein the retainer element is configured to be disposed in proximity to a distal end of the second end portion.

7. The adapter of claim 1, further comprising a gripping feature configured to assist in screwing the first end portion of the adapter into the NPT screw-style vent port.

8. The adapter of claim 1, wherein the second end portion comprises a flow feature configured to allow flow radially between the bore of the second end portion and an exterior environment in the event that a distal end of the bore of the second end portion is blocked.

9. A motor protector of an ESP assembly having a motor, comprising:
a housing;
an expandable element disposed within the housing and configured to expand in the event that oil in the motor expands due to heating;
one or more NPT screw-style vent port configured to provide fluid communication between the expandable element and an external environment; and
a check valve adapter for each NPT screw-style vent port, configured to receive a cartridge-style check valve and to removably couple to the corresponding NPT screw-style vent port.

10. The motor protector of claim 9, wherein the check valve adapter comprises:
a first end portion configured for removable attachment to an NPT screw-style vent port; and
a second end portion configured to receive a cartridge-style check valve which is configured to allow controlled fluid flow therethrough in only one direction when pressure reaches a pre-set level;
wherein the first end portion is in fluid communication with the second end portion; and
wherein the second end portion is configured to receive the cartridge-style check valve in either orientation.

11. The motor protector of claim 10, further comprising a cartridge-style check valve for each corresponding check valve adapter which is configured to allow controlled fluid flow therethrough in only one direction.

12. The motor protector of claim 11, wherein the cartridge-style check valve is oriented in the adapter to provide one-way fluid flow from the expandable element to the external environment through the NPT screw-style vent port.

13. The motor protector of claim 11, further comprising a second NPT screw-style vent port, a second check valve adapter disposed within the second NPT screw-style vent port, and a second cartridge-style check valve, wherein the first adapter and the second adapter have corresponding cartridge-style check valves disposed therein in opposite orientations.

14. The motor protector of claim 13, wherein the first and second adapters are substantially identical, the first and second NPT screw-style vent ports are substantially identical, and the first and second cartridge-style check valves are substantially identical.

15. A method of controlling fluid flow in a motor protector of an ESP assembly, comprising:
determining a desired direction of flow through an NPT screw-style vent port of the motor protector;
orienting a cartridge-style check valve with respect to an adapter responsive to the determination, wherein the adapter is configured to receive the cartridge-style check valve in either orientation, allowing for flow direction change therethrough, and is configured for removable attachment to the NPT screw-style vent port;
removably retaining the cartridge-style check valve in the adapter;
removably retaining the adapter within the NPT screw-style vent port; and
providing fluid flow through the NPT screw-style vent port in a first flow direction.

16. The method of claim 15, further comprising:
removing the cartridge-style check valve from the adapter;
reorienting the cartridge-style check valve with respect to the adapter;
retaining the reoriented cartridge-style check valve in the adapter; and
providing fluid flow through the NPT screw-style vent port in a second direction.

17. The method of claim 15, further comprising: removing the adapter from the NPT screw-style vent port; and removably attaching an NPT screw-style check valve in the same NPT screw-style vent port.

18. The method of claim 15, wherein the NPT screw-style vent port provides fluid communication between an expandable element of the motor protector and an exterior space of the motor protector disposed between the expandable element and the housing; the method further comprising: venting oil from the expandable element through the cartridge-style check valve responsive to pressure in the expandable element reaching a pre-set limit.

19. The method of claim 18, wherein the motor protector further comprises a second NPT screw-style vent port configured to vent wellbore fluids from a bottom section of the motor protector to the exterior space of the motor protector, the method further comprising:
orienting a second cartridge-style check valve in a second adapter;
removably retaining the second cartridge-style check valve in the second adapter; and
removably retaining the second adapter in the second NPT screw-style vent port, wherein:
the second adapter is substantially identical to the first adapter,
the second cartridge-style check valve is substantially the same as the first cartridge-style check valve,
the second NPT screw-style vent port is substantially the same as the first NPT screw-style vent port, and
the second cartridge-style check valve orientation is opposite the first cartridge-style check valve orientation.

20. The method of claim 19, further comprising: removing the second adapter from the second NPT screw-type vent port; and removably attaching a second NPT screw-style check valve in the second NPT screw-style vent port.

* * * * *